(12) United States Patent
Kim

(10) Patent No.: US 11,830,426 B2
(45) Date of Patent: Nov. 28, 2023

(54) IMAGE DISPLAY DEVICE

(71) Applicant: LG ELECTRONICS INC., Seoul (KR)

(72) Inventor: Dohoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 20 days.

(21) Appl. No.: 17/771,780

(22) PCT Filed: Oct. 25, 2019

(86) PCT No.: PCT/KR2019/014219
§ 371 (c)(1),
(2) Date: Apr. 25, 2022

(87) PCT Pub. No.: WO2021/080060
PCT Pub. Date: Apr. 29, 2021

(65) Prior Publication Data
US 2022/0375406 A1   Nov. 24, 2022

(51) Int. Cl.
*G09G 3/3233* (2016.01)
*H02M 7/23* (2006.01)
*H04N 5/63* (2006.01)

(52) U.S. Cl.
CPC ............ *G09G 3/3233* (2013.01); *H02M 7/23* (2013.01); *G09G 2300/0842* (2013.01);
(Continued)

(58) Field of Classification Search
None
See application file for complete search history.

(56) References Cited

U.S. PATENT DOCUMENTS

2014/0062322 A1\* 3/2014 Yu .......................... H05B 45/10
315/200 R
2015/0078043 A1\* 3/2015 Harkin .................... H02M 7/10
363/37

(Continued)

FOREIGN PATENT DOCUMENTS

KR    20080109551    12/2008
KR      101147181     5/2012
(Continued)

OTHER PUBLICATIONS

PCT International Application No. PCT/KR2019/014219, International Search Report dated Jul. 17, 2020, 4 pages.
(Continued)

*Primary Examiner* — Andre L Matthews
(74) *Attorney, Agent, or Firm* — LEE, HONG, DEGERMAN, KANG & WAIMEY PC

(57) ABSTRACT

An image display device of the present invention comprises a display and a power supply unit, and the power supply unit comprises: a first voltage detection unit that detects an input AC voltage by using a first resistance element; a second voltage detection unit that detects an input AC voltage by using a differential circuit having a capacitor element and a second resistance element; a converter that converts the level of the input voltage on the basis of a switching operation of a switching element so as to output a DC voltage; and a control unit that may control the switching element in the converter to be turned on, on the basis of a first signal detected by the first voltage detection unit or a second signal detected by the second voltage detection unit. As such, the present invention operates stably even when an AC voltage of a square wave is applied.

16 Claims, 19 Drawing Sheets

(52) U.S. Cl.
CPC ............... *G09G 2320/029* (2013.01); *G09G 2320/0233* (2013.01); *G09G 2320/045* (2013.01); *G09G 2320/046* (2013.01); *G09G 2330/021* (2013.01); *G09G 2330/026* (2013.01); *H04N 5/63* (2013.01)

(56) References Cited

U.S. PATENT DOCUMENTS

| 2015/0143150 | A1* | 5/2015 | Verdun | ............. | G06F 1/26 |
| | | | | | 713/323 |
| 2017/0309232 | A1* | 10/2017 | Joo | ............. | G09G 3/3406 |
| 2019/0319528 | A1 | 10/2019 | Matsuura et al. | | |
| 2022/0123664 | A1* | 4/2022 | Yu | ............. | G06F 11/3058 |

FOREIGN PATENT DOCUMENTS

| KR | 20140144885 | 12/2014 |
| KR | 20190043371 | 4/2019 |

OTHER PUBLICATIONS

European Patent Office Application Serial No. 19949832.0, Search Report dated May 24, 2023, 8 pages.

\* cited by examiner

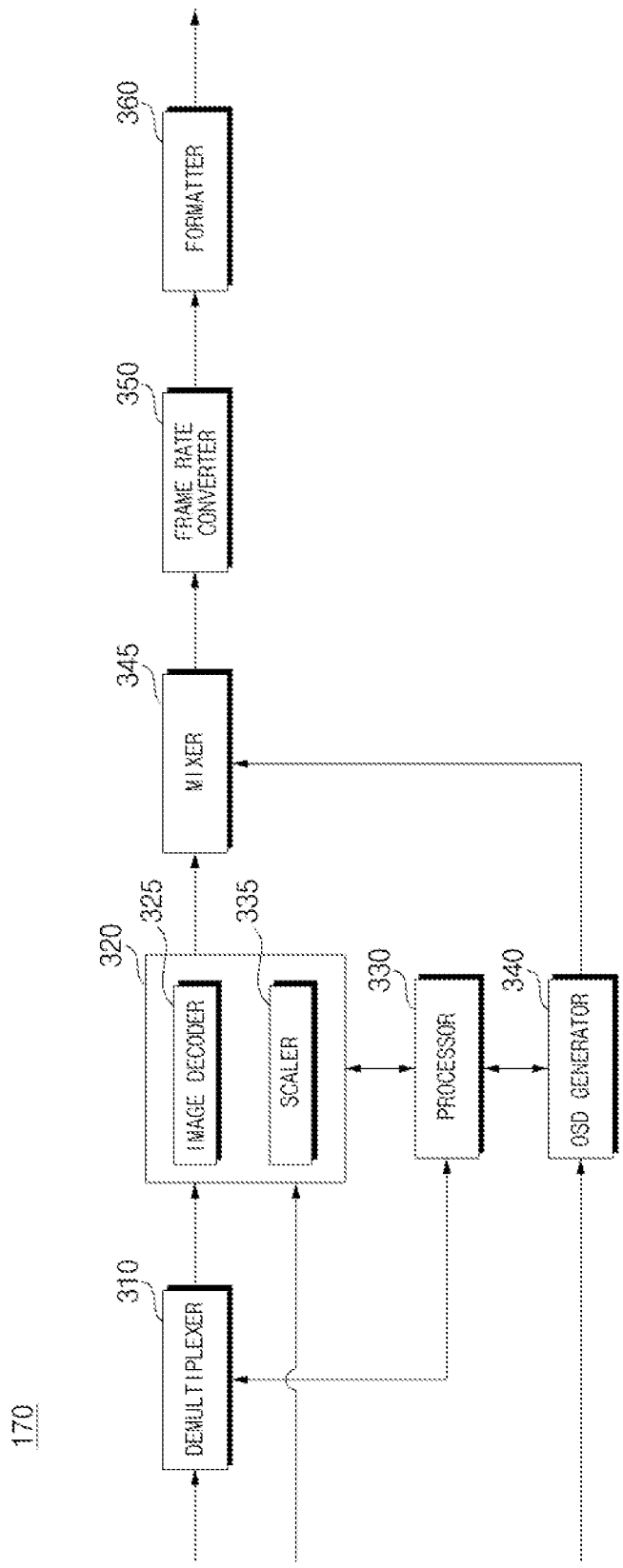

(a) (b) (c)

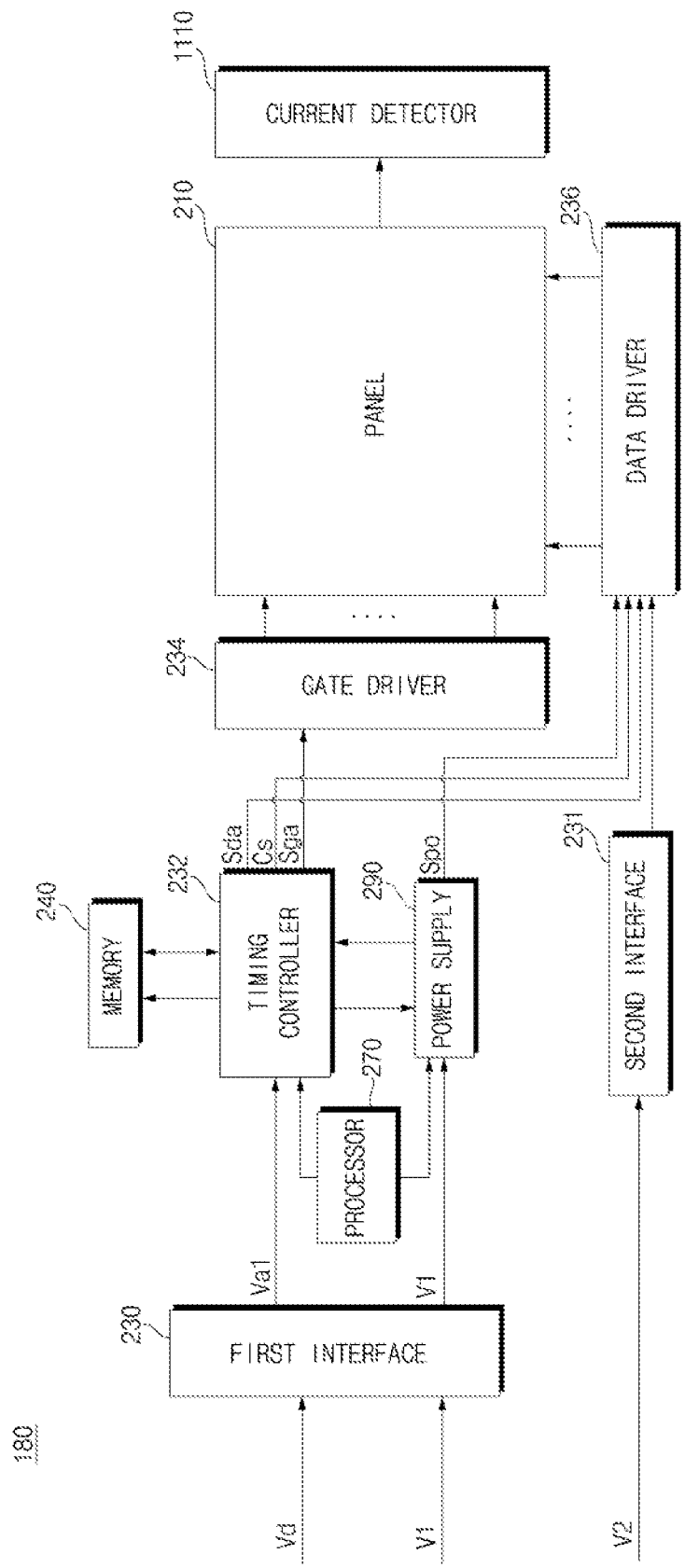

IMAGE DISPLAY DEVICE

CROSS-REFERENCE TO RELATED APPLICATIONS

This application is the National Stage filing under 35 U.S.C. 371 of International Application No. PCT/KR2019/014219, filed on Oct. 25, 2019, the contents of which are all incorporated by reference herein in their entirety.

BACKGROUND OF THE INVENTION

1. Field of the Invention

The present disclosure relates to an image display apparatus, and more particularly, to an image display apparatus capable of performing a stable operation even when a square wave alternating current (AC) voltage is applied.

2. Description of the Related Art

An image display apparatus is an apparatus having a function of providing an image that a user can watch. The user can watch various images through the image display apparatus.

By using self-generated power, an AC voltage may be supplied to an image display apparatus which may be installed inside or outside of a building.

Generally, a waveform of the AC voltage supplied by a grid is in the form of a sine wave, but the AC voltage supplied by self-generation may be in the form of a square wave or the like, rather than the sine wave.

If the AC voltage, which is not in the form of the sine wave, is supplied to the image display apparatus by self-generation and the like, an existing circuit configuration may not recognize the supplied AC voltage, causing a problem in that the power may not be turned on.

SUMMARY OF THE INVENTION

It is an object of the present disclosure to provide an image display apparatus capable of performing a stable operation even when a square wave AC voltage is applied.

It is another object of the present disclosure to provide an image display apparatus capable of performing a stable operation even when various AC voltages are applied.

In accordance with an aspect of the present disclosure, an image display apparatus includes: a display; and a power supply configured to supply power to the display, wherein the power supply includes: a first voltage detector configured to detect an input alternating current (AC) voltage by using a first resistor; a second voltage detector configured to detect the input AC voltage by using a differential circuit including a capacitor and a second resistor; a converter including at least one switching element and configured to convert a level of the input voltage based on a switching operation of the switching element to output a direct current (DC) voltage; and a controller including a first terminal for receiving a first signal detected by the first voltage detector, and a second terminal for receiving a second signal detected by the second voltage detector, wherein the controller is configured to turn on the switching element in the converter based on the first signal or the second signal.

Meanwhile, in response to the input AC voltage being a sine wave, the controller may turn on the switching element in the converter based on the first signal; and in response to the input AC voltage being a square wave, the controller may turn on the switching element in the converter based on the second signal.

Meanwhile, upon determining that the input AC voltage is applied, the controller may turn on the switching element in the converter based on the first signal or the second signal.

Meanwhile, in response to a level of the first signal crossing a first reference level, the controller may turn on the switching element in the converter.

Meanwhile, in response to a level of the second signal crossing a second reference level, the controller may turn on the switching element in the converter.

Meanwhile, in response to the input AC voltage being the sine wave, the first voltage detector may output a first signal having a level that crosses the first reference level; and in response to the input AC voltage being the square wave, the first voltage detector may output a second signal having a level higher than the first reference level.

Meanwhile, the second voltage detector may include: the capacitor connected in series between the first node and the second node; a diode connected between the second node and a ground terminal; a second diode connected between the second node and a third node; the second resistor connected between the third node and the ground terminal; and a second switching element having a gate terminal connected to the third node and a source terminal connected to the ground terminal.

Meanwhile, in response to the input AC voltage being the square wave, the second switching element may be turned on based on a portion of a positive level of the square wave, wherein when the second switching element is turned on, the second voltage detector may output a low level, and when the second switching element is turned off, the second voltage detector may output a high level.

Meanwhile, the low level output by the second voltage detector may be desirably lower than a second reference level, and the high level output by the second voltage detector may be desirably greater than the second reference level.

Meanwhile, in response to the input AC voltage being the square wave, the capacitor may be charged based on the square wave, wherein the second diode may bypass only the positive level of the square wave and may block the negative level.

Meanwhile, the second voltage detector may further include a Zener diode between the third node and the ground terminal, wherein a voltage clamped by the Zener diode may be applied to the gate terminal of the second switching element.

Meanwhile, in response to the input AC voltage being the square wave having the positive level and the negative level, the second voltage detector may output a second signal having a high level, which is partially delayed with respect to the positive level, and is maintained at the high level in response to the negative level.

Meanwhile, in response to the input AC voltage being the sine wave, the second voltage detector may output a second signal which is maintained at a high level as the second switching element is turned off successively.

Meanwhile, the display may include an organic light emitting diode panel.

In accordance with another aspect of the present disclosure, an image display apparatus includes: a display; and a power supply configured to supply power to the display, wherein the power supply includes: a voltage detector configured to detect an input alternating current (AC) voltage by using a differential circuit including a capacitor and a resistor; a converter including at least one switching element and configured to convert a level of the input voltage based on a switching operation of the switching element to output a direct current (DC) voltage; and a controller including a terminal for receiving a signal detected by the voltage detector, wherein in response to the input AC voltage being a square wave having a positive level and a negative level, the voltage detector may output a signal having a high level, which is partially delayed with respect to the positive level, and is maintained at the high level in response to the negative level, wherein the controller may turn on the switching element in the converter based on the signal output by the voltage detector.

Meanwhile, in response to a level of the signal output by the voltage detector crossing a reference level, the controller may turn on the switching element.

Effects of the Invention

An image display apparatus according to an embodiment of the present disclosure includes: a display; and a power supply configured to supply power to the display, wherein the power supply includes: a first voltage detector configured to detect an input alternating current (AC) voltage by using a first resistor; a second voltage detector configured to detect the input AC voltage by using a differential circuit including a capacitor and a second resistor; a converter including at least one switching element and configured to convert a level of the input voltage based on a switching operation of the switching element to output a direct current (DC) voltage; and a controller including a first terminal for receiving a first signal detected by the first voltage detector, and a second terminal for receiving a second signal detected by the second voltage detector, wherein the controller is configured to turn on the switching element in the converter based on the first signal or the second signal, thereby performing a stable operation even when a square wave AC voltage is applied. Particularly, even when various AC voltages are applied, a stable operation may be performed.

Meanwhile, in response to the input AC voltage being a sine wave, the controller may turn on the switching element in the converter based on the first signal; and in response to the input AC voltage being a square wave, the controller may turn on the switching element in the converter based on the second signal, thereby performing a stable operation even when the square wave AC voltage is applied.

Meanwhile, upon determining that the input AC voltage is applied, the controller may turn on the switching element in the converter based on the first signal or the second signal, thereby performing a stable operation even when the square wave AC voltage is applied.

Meanwhile, in response to a level of the first signal crossing a first reference level, the controller may turn on the switching element in the converter, thereby performing a stable operation even when the square wave AC voltage is applied.

Meanwhile, in response to a level of the second signal crossing a second reference level, the controller may turn on the switching element in the converter, thereby performing a stable operation even when the square wave AC voltage is applied.

Meanwhile, in response to the input AC voltage being the sine wave, the first voltage detector may output a first signal having a level that crosses the first reference level; and in response to the input AC voltage being the square wave, the first voltage detector may output a second signal having a level higher than the first reference level, thereby performing a stable operation even when the square wave AC voltage is applied.

Meanwhile, the second voltage detector may include: the capacitor connected in series between the first node and the second node; a diode connected between the second node and a ground terminal; a second diode connected between the second node and a third node; the second resistor connected between the third node and the ground terminal; and a second switching element having a gate terminal connected to the third node and a source terminal connected to the ground terminal.

Meanwhile, in response to the input AC voltage being the square wave, the second switching element may be turned on based on a portion of a positive level of the square wave, wherein when the second switching element is turned on, the second voltage detector may output a low level, and when the second switching element is turned off, the second voltage detector may output a high level, thereby performing a stable operation even when the square wave AC voltage is applied.

Meanwhile, the low level output by the second voltage detector may be desirably lower than a second reference level, and the high level output by the second voltage detector may be desirably greater than the second reference level, thereby performing a stable operation even when the square wave AC voltage is applied.

Meanwhile, in response to the input AC voltage being the square wave, the capacitor may be charged based on the square wave, wherein the second diode may bypass only the positive level of the square wave and may block the negative level, thereby performing a stable operation even when the square wave AC voltage is applied.

Meanwhile, the second voltage detector may further include a Zener diode between the third node and the ground terminal, wherein a voltage clamped by the Zener diode may be applied to the gate terminal of the second switching element, thereby performing a stable operation even when the square wave AC voltage is applied.

Meanwhile, in response to the input AC voltage being the square wave having the positive level and the negative level, the second voltage detector may output a second signal having a high level, which is partially delayed with respect to the positive level, and is maintained at the high level in response to the negative level, thereby performing a stable operation even when the square wave AC voltage is applied.

Meanwhile, in response to the input AC voltage being the sine wave, the second voltage detector may output a second signal which is maintained at a high level as the second switching element is turned off successively, thereby performing a stable operation even when the square wave AC voltage is applied.

Meanwhile, an image display apparatus according to another embodiment of the present disclosure includes: a display; and a power supply configured to supply power to the display, wherein the power supply includes: a voltage detector configured to detect an input alternating current (AC) voltage by using a differential circuit including a capacitor and a resistor; a converter including at least one switching element and configured to convert a level of the input voltage based on a switching operation of the switching element to output a direct current (DC) voltage; and a controller including a terminal for receiving a signal detected by the voltage detector, wherein in response to the input AC voltage being a square wave having a positive level and a negative level, the voltage detector may output a signal having a high level, which is partially delayed with respect to the positive level, and is maintained at the high level in response to the negative level, wherein the controller may turn on the switching element in the converter based on the signal output by the voltage detector, thereby performing a stable operation even when a square wave AC voltage is applied. Particularly, even when various AC voltage are applied, a stable operation may be performed.

Meanwhile, in response to a level of the signal output by the voltage detector crossing a reference level, the controller may turn on the switching element, thereby performing a stable operation even when the square wave AC voltage is applied.

BRIEF DESCRIPTION OF THE DRAWINGS

FIG. 3 is an example of an internal block diagram of a controller of FIG. 2;

FIG. 5 is an internal block diagram of a display of FIG. 2;

DETAILED DESCRIPTION OF THE PREFERRED EMBODIMENTS

Hereinafter, the present invention will be described in detail with reference to the accompanying drawings. With respect to constituent elements used in the following description, suffixes "module" and "unit" are given only in consideration of ease in the preparation of the specification, and do not have or serve as different meanings. Accordingly, the suffixes "module" and "unit" may be used interchangeably.

Figure 1:
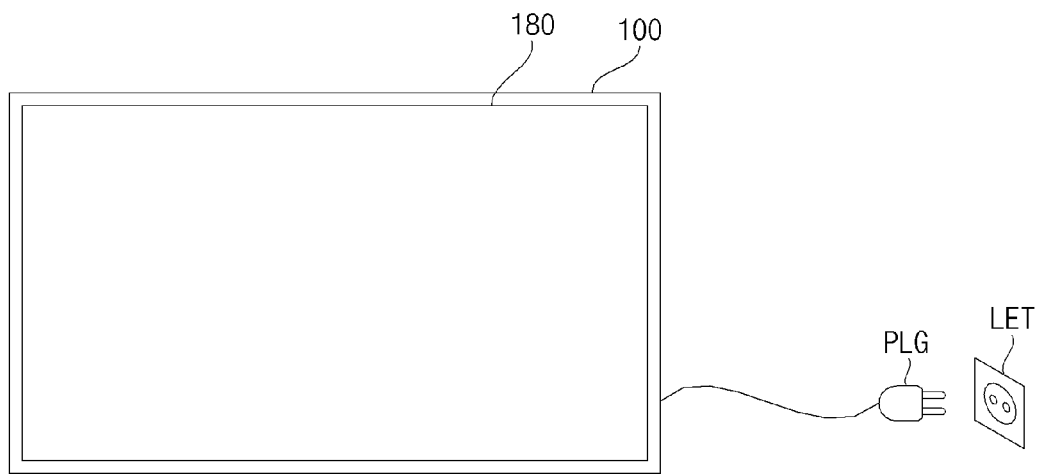
FIG. 1 is a diagram illustrating an image display apparatus according to an embodiment of the present invention.

FIG. 1 is a diagram illustrating an image display apparatus according to an embodiment of the present invention.

Referring to the drawing, an image display apparatus 100 may include a display 180.

Meanwhile, the display 180 may be implemented with any one of various panels. For example, the display 180 may be any one of a liquid crystal display panel (LCD panel), an organic light emitting diode panel (OLED panel), a light emitting diode panel (LED panel).

Meanwhile, the following description will be given of an example in which the display 180 includes an OLED panel.

The image display apparatus according to an embodiment of the present disclosure may include the display 180 including an OLED panel 210.

Referring to the drawing, when a plug PLG, electrically connected to the image display apparatus 100, is connected to an outlet LET, alternating current (AC) power Vac is supplied to a power supply 190, and when the plug PLG is detached from the outlet LET, the AC power is not supplied to the power supply 190.

Meanwhile, by using self-generated power, an AC voltage may be supplied to the image display apparatus 100 which may be installed inside or outside of a building. That is, the self-generated AC voltage may be supplied from the outlet LET illustrated in the drawing.

In this case, the AC voltage supplied by self-generation may be an AC voltage in the form of a square wave or the like, rather than a sine wave.

If the AC voltage, which is not in the form of a sine wave, is supplied to the image display apparatus 100 by self-generation and the like, an existing circuit configuration may not recognize the supplied AC voltage, causing a problem in that the power may not be turned on.

Accordingly, the present disclosure provides the image display apparatus 100 capable of performing a stable operation even when various AC voltages are applied.

Particularly, in the present disclosure, the image display apparatus 100 may perform a stable operation even when a square wave AC voltage is applied.

To this end, the image display apparatus 100 according to an embodiment of the present disclosure may include the display 180 and the power supply 190 for supplying power to the display 180.

Particularly, the power supply 190 according to an embodiment of the present disclosure includes at least one of switching elements Sa and Sb; and a converter 700 configured to convert a level of input power based on a switching operation of the switching elements Sa and Sb, so as to output direct-current (DC) power Vdc, in which according to a load 900 at an output terminal nc-nd of the converter 700, the power supply 190 may operate in a first mode, in which the switching elements Sa and Sb perform a continuous switching operation, and a second mode in which the switching elements Sa and Sb perform the continuous switching operation and then stop the switching operation. Accordingly, even when a square wave AC voltage is applied, the power supply 190 may operate stably. Particularly, the second mode requires less switching compared to the first mode, thereby reducing a switching loss and thus reducing power consumption.

Meanwhile, an image display apparatus 100 according to another embodiment of the present disclosure includes a display 180 having an OLED panel, and a power supply 190 for supplying power to the display 180, in which the power supply 190 includes: at least one of switching elements Sa and Sb; and a converter 700 configured to convert a level of input power based on a switching operation of the switching elements Sa and Sb, so as to output direct-current (DC) power Vdc, in which according to an image displayed on the display 180, the power supply 190 may operate in a first mode, in which the switching elements Sa and Sb perform a continuous switching operation, and a second mode in which the switching elements Sa and Sb perform the continuous switching operation and then stop the switching operation, thereby reducing power consumption according to the image. Accordingly, even when a square wave AC voltage is applied, the power supply 190 may operate stably. Particularly, the second mode requires less switching compared to the first mode, thereby reducing a switching loss and thus reducing power consumption.

Various operating methods of the above image display apparatus 100 will be described in further detail later with reference to FIG. 9 and the following figures.

Meanwhile, the image display apparatus 100 of FIG. 1 may be a TV, a monitor, a vehicle display, and the like.

Figure 2:
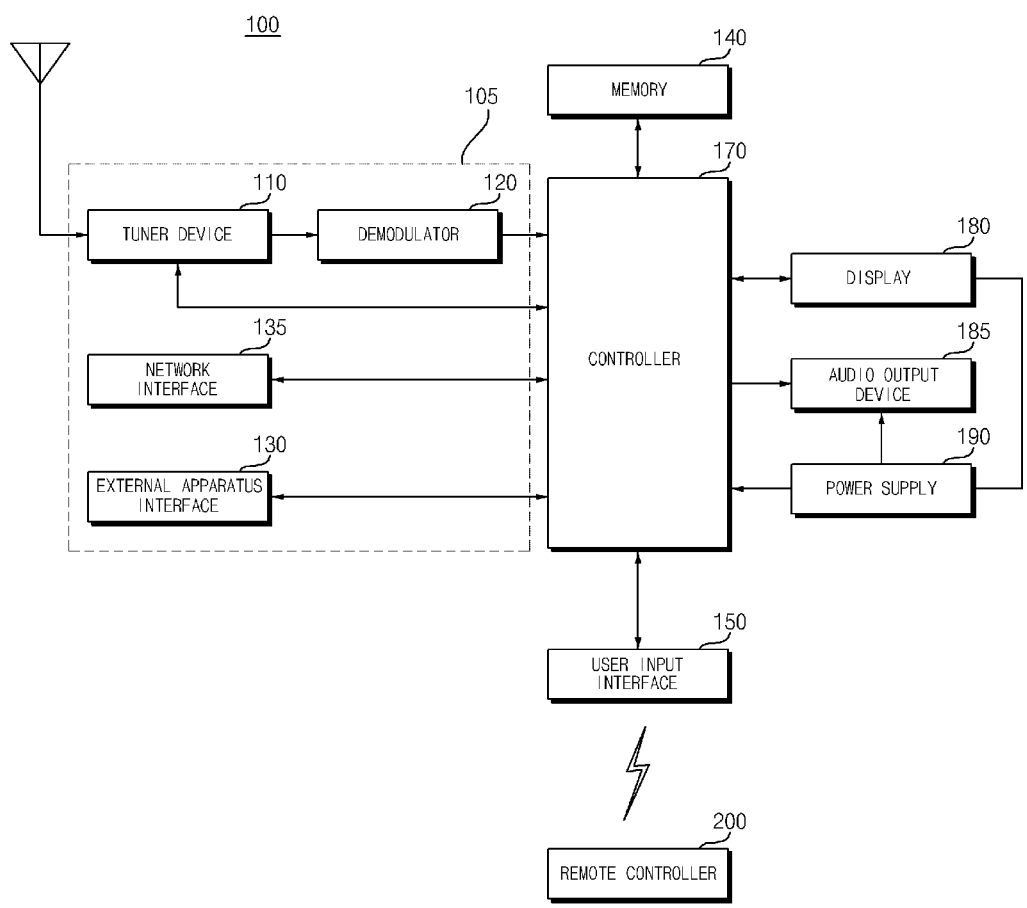
FIG. 2 is an example of an internal block diagram of the image display apparatus of FIG. 1.

FIG. 2 is an example of an internal block diagram of the image display apparatus of FIG. 1.

Referring to FIG. 2, the image display apparatus 100 according to an embodiment of the present invention includes a broadcast receiver 105, a memory 140, a user input interface 150, a sensor device (not shown), a controller 170, a display 180, and an audio output device 185.

The broadcast receiver 105 may include a tuner device 110, a demodulator 120, a network interface 135, and an external apparatus interface 130.

Meanwhile, unlike the drawing, the broadcast receiver 105 may include only the tuner device 110, the demodulator 120, and the external apparatus interface 130. That is, the network interface 135 may not be included.

The tuner device 110 selects an RF broadcast signal corresponding to a channel selected by a user or all pre-stored channels among radio frequency (RF) broadcast signals received through an antenna (not shown). In addition, the selected RF broadcast signal is converted into an intermediate frequency signal, a baseband image, or a audio signal.

For example, if the selected RF broadcast signal is a digital broadcast signal, it is converted into a digital IF signal (DIF). If the selected RF broadcast signal is an analog broadcast signal, it is converted into an analog baseband image or audio signal (CVBS/SIF). That is, the tuner device 110 can process a digital broadcast signal or an analog broadcast signal. The analog baseband image or audio signal (CVBS/SIF) output from the tuner device 110 may be directly input to the controller 170.

Meanwhile, the tuner device 110 can include a plurality of tuners for receiving broadcast signals of a plurality of channels. Alternatively, a single tuner that simultaneously receives broadcast signals of a plurality of channels is also available.

The demodulator 120 receives the converted digital IF signal DIF from the tuner device 110 and performs a demodulation operation.

The demodulator 120 may perform demodulation and channel decoding and then output a stream signal TS. At this time, the stream signal may be a multiplexed signal of an image signal, a audio signal, or a data signal.

The stream signal output from the demodulator 120 may be input to the controller 170. The controller 170 performs demultiplexing, image/audio signal processing, and the like, and then outputs an image to the display 180 and outputs audio to the audio output device 185.

The external apparatus interface 130 may transmit or receive data with a connected external apparatus (not shown), e.g., a set-top box 50. To this end, the external apparatus interface 130 may include an A/V input and output device (not shown).

The external apparatus interface 130 may be connected in wired or wirelessly to an external apparatus such as a digital versatile disk (DVD), a Blu ray, a game equipment, a camera, a camcorder, a computer (note book), and a set-top box, and may perform an input/output operation with an external apparatus.

The A/V input and output device may receive image and audio signals from an external apparatus. Meanwhile, a wireless communicator (not shown) may perform short-range wireless communication with other electronic apparatus.

Through the wireless communicator (not shown), the external apparatus interface 130 may exchange data with an adjacent mobile terminal 600. In particular, in a mirroring mode, the external apparatus interface 130 may receive device information, executed application information, application image, and the like from the mobile terminal 600.

The network interface 135 provides an interface for connecting the image display apparatus 100 to a wired/wireless network including the Internet network. For example, the network interface 135 may receive, via the network, content or data provided by the Internet, a content provider, or a network operator.

Meanwhile, the network interface 135 may include a wireless communicator (not shown).

The memory 140 may store a program for each signal processing and control in the controller 170, and may store signal-processed image, audio, or data signal.

In addition, the memory 140 may serve to temporarily store image, audio, or data signal input to the external apparatus interface 130. In addition, the memory 140 may store information on a certain broadcast channel through a channel memory function such as a channel map.

Although FIG. 2 illustrates that the memory is provided separately from the controller 170, the scope of the present invention is not limited thereto. The memory 140 may be included in the controller 170.

The user input interface 150 transmits a signal input by the user to the controller 170 or transmits a signal from the controller 170 to the user.

For example, it may transmit/receive a user input signal such as power on/off, channel selection, screen setting, etc., from a remote controller 200, may transfer a user input signal input from a local key (not shown) such as a power key, a channel key, a volume key, a set value, etc., to the controller 170, may transfer a user input signal input from a memory (not shown) that senses a user's gesture to the controller 170, or may transmit a signal from the controller 170 to the sensor device (not shown).

The controller 170 may demultiplex the input stream through the tuner device 110, the demodulator 120, the network interface 135, or the external apparatus interface 130, or process the demultiplexed signals to generate and output a signal for image or audio output.

The image signal processed by the controller 170 is input to the display 180, and may be displayed as an image corresponding to the image signal. In addition, the image signal processed by the controller 170 may be input to the external output apparatus through the external apparatus interface 130.

The audio signal processed by the controller 170 may be output to the audio output device 185 as an audio signal. In addition, audio signal processed by the controller 170 may be input to the external output apparatus through the external apparatus interface 130.

Although not shown in FIG. 2, the controller 170 may include a demultiplexer, an image processor, and the like. This will be described later with reference to FIG. 3.

In addition, the controller 170 can control the overall operation of the image display apparatus 100. For example, the controller 170 may control the tuner device 110 to control the tuning of the RF broadcast corresponding to the channel selected by the user or the previously stored channel.

In addition, the controller 170 may control the image display apparatus 100 according to a user command input through the user input interface 150 or an internal program.

Meanwhile, the controller 170 may control the display 180 to display an image. At this time, the image displayed on the display 180 may be a still image or a moving image, and may be a 2D image or a 3D image.

Meanwhile, the controller 170 may display a certain object in an image displayed on the display 180. For example, the object may be at least one of a connected web screen (newspaper, magazine, etc.), an electronic program guide (EPG), various menus, a widget, an icon, a still image, a moving image, and a text.

Meanwhile, the controller 170 may recognize the position of the user based on the image photographed by a photographing device (not shown). For example, the distance (z-axis coordinate) between a user and the image display apparatus 100 can be determined. In addition, the x-axis coordinate and the y-axis coordinate in the display 180 corresponding to a user position can be determined.

The display 180 generates a driving signal by converting an image signal, a data signal, an OSD signal, a control signal processed by the controller 170, an image signal, a data signal, a control signal, and the like received from the external apparatus interface 130.

Meanwhile, the display 180 may be configured as a touch screen and used as an input device in addition to an output device.

The audio output device 185 receives a signal processed by the controller 170 and outputs it as an audio.

The photographing device (not shown) photographs a user. The photographing device (not shown) may be implemented by a single camera, but the present invention is not limited thereto and may be implemented by a plurality of cameras. Image information photographed by the photographing device (not shown) may be input to the controller 170.

The controller 170 may sense a gesture of the user based on each of the images photographed by the photographing device (not shown), the signals detected from the sensor device (not shown), or a combination thereof.

The power supply 190 supplies corresponding power to the image display apparatus 100. Particularly, the power may be supplied to a controller 170 which can be implemented in the form of a system on chip (SOC), a display 180 for displaying an image, and an audio output device 185 for outputting an audio.

Specifically, the power supply 190 may include a converter for converting an AC power into a DC power, and a DC/DC converter for converting the level of the DC power.

The remote controller 200 transmits the user input to the user input interface 150. To this end, the remote controller 200 may use Bluetooth, a radio frequency (RF) communication, an infrared (IR) communication, an Ultra Wideband (UWB), ZigBee, or the like. In addition, the remote controller 200 may receive the image, audio, or data signal output from the user input interface 150, and display it on the remote controller 200 or output it as an audio.

Meanwhile, the image display apparatus 100 may be a fixed or mobile digital broadcasting receiver capable of receiving digital broadcasting.

Meanwhile, a block diagram of the image display apparatus 100 shown in FIG. 2 is a block diagram for an embodiment of the present invention. Each component of the block diagram may be integrated, added, or omitted according to a specification of the image display apparatus 100 actually implemented. That is, two or more components may be combined into a single component as needed, or a single component may be divided into two or more components. The function performed in each block is described for the purpose of illustrating embodiments of the present invention, and specific operation and apparatus do not limit the scope of the present invention.

FIG. 3 is an example of an internal block diagram of a controller of FIG. 2.

Referring to the drawing, the controller 170 according to an embodiment of the present invention may include a demultiplexer 310, an image processor 320, a processor 330, an OSD generator 340, a mixer 345, a frame rate converter 350, and a formatter 360. In addition, it may further include an audio processor (not shown), and a data processor (not shown).

The demultiplexer 310 demultiplexes the input stream. For example, when an MPEG-2 TS is input, it can be demultiplexed into image, audio, and data signal, respectively. Here, the stream signal input to the demultiplexer 310 may be a stream signal output from the tuner device 110, the demodulator 120, or the external apparatus interface 130.

The image processor 320 may perform image processing of the demultiplexed image signal. To this end, the image processor 320 may include an image decoder 325 and a scaler 335.

The image decoder 325 decodes the demultiplexed image signal, and the scaler 335 performs scaling so that the resolution of the decoded image signal can be output from the display 180.

The image decoder 325 can include a decoder of various standards. For example, a 3D image decoder for MPEG-2, H.264 decoder, a color image, and a depth image, and a decoder for a multiple view image may be provided.

The processor 330 may control the overall operation of the image display apparatus 100 or the controller 170. For example, the processor 330 may control the tuner 110 to accomplish the tuning of an RF broadcast corresponding to a channel selected by the user or a previously stored channel.

In addition, the processor 330 may control the image display apparatus 100 by a user command input through the user input interface 150 or an internal program.

In addition, the processor 330 may perform a control of data transmission with the network interface 135 or the external apparatus interface 130.

In addition, the processor 330 may control operations of the demultiplexer 310, the image processor 320, the OSD generator 340, and the like in the controller 170.

The OSD generator 340 generates an OSD signal according to a user input or by itself. For example, based on a user input signal, the OSD generator 340 may generate a signal for displaying various information as a graphic or a text on the screen of the display 180. The generated OSD signal may include various data such as a user interface screen of the image display apparatus 100, various menu screens, a widget, and an icon. In addition, the generated OSD signal may include a 2D object or a 3D object.

In addition, the OSD generator 340 may generate a pointer that can be displayed on the display, based on a pointing signal input from the remote controller 200. In particular, such a pointer may be generated by a pointing signal processor, and the OSD generator 340 may include such a pointing signal processor (not shown). Obviously, the pointing signal processor (not shown) may be provided separately from the OSD generator 340.

The mixer 345 may mix an OSD signal generated by the OSD generator 340 with a decoded image signal image-processed by the image processor 320. The mixed image signal is supplied to the frame rate converter 350.

The frame rate converter (FRC) 350 may convert the frame rate of an input image. Meanwhile, the frame rate converter 350 can also directly output the frame rate without any additional frame rate conversion.

Meanwhile, the formatter 360 may convert the format of an input image signal into a image signal for display on the display and output it.

The formatter 360 may change the format of the image signal. For example, it may change the format of the 3D image signal into any one of various 3D formats such as a side by side format, a top/down format, a frame sequential format, an interlaced format, a checker box format, and the like.

Meanwhile, the audio processor (not shown) in the controller 170 may perform the audio processing of the demultiplexed audio signal. To this end, the audio processor (not shown) may include various decoders.

In addition, the audio processor (not shown) in the controller 170 may process a base, a treble, a volume control, and the like.

The data processor (not shown) in the controller 170 may perform data processing of the demultiplexed data signal. For example, when the demultiplexed data signal is a coded data signal, it can be decoded. The encoded data signal may be electronic program guide information including broadcast information such as a start time and an end time of a broadcast program broadcasted on each channel.

Meanwhile, a block diagram of the controller 170 shown in FIG. 3 is a block diagram for an embodiment of the present invention. Each component of the block diagram may be integrated, added, or omitted according to a specification of the controller 170 actually implemented.

In particular, the frame rate converter 350 and the formatter 360 may not be provided in the controller 170, but may be separately provided or may be provided as a separate single module.

Figure 4A:
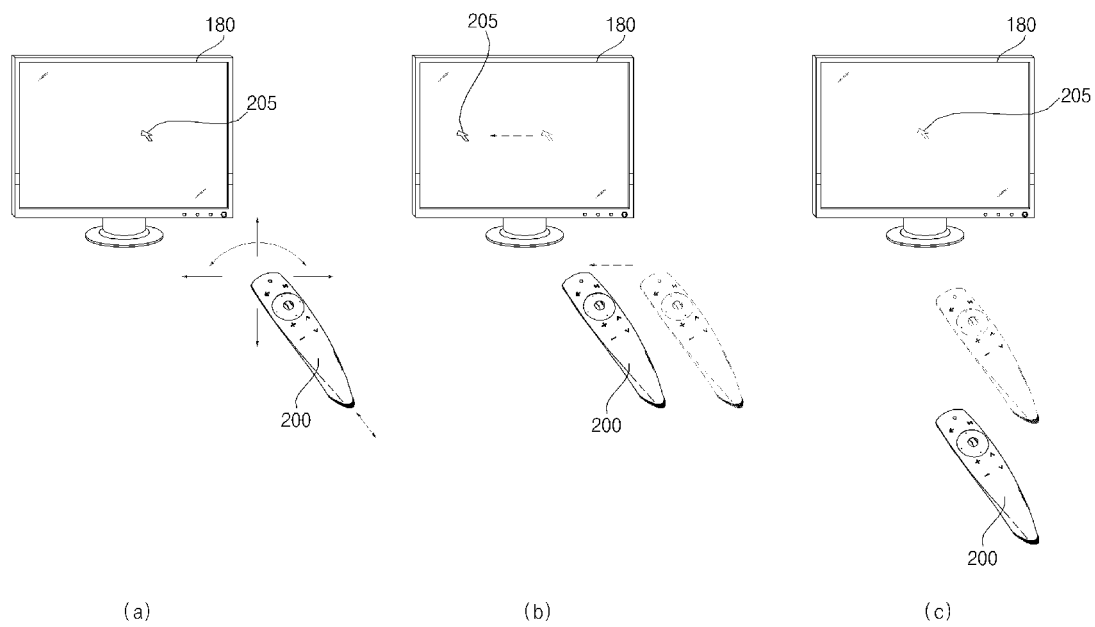
FIG. 4A is a diagram illustrating a control method of a remote controller of FIG. 2.

FIG. 4A is a diagram illustrating a control method of a remote controller of FIG. 2.

As shown in FIG. 4A(a), it is illustrated that a pointer 205 corresponding to the remote controller 200 is displayed on the display 180.

The user may move or rotate the remote controller 200 up and down, left and right (FIG. 4A(b)), and back and forth (FIG. 4A(c)). The pointer 205 displayed on the display 180 of the image display apparatus corresponds to the motion of the remote controller 200. Such a remote controller 200 may be referred to as a space remote controller or a 3D pointing apparatus, because the pointer 205 is moved and displayed according to the movement in a 3D space, as shown in the drawing.

FIG. 4A(b) illustrates that when the user moves the remote controller 200 to the left, the pointer 205 displayed on the display 180 of the image display apparatus also moves to the left correspondingly.

Information on the motion of the remote controller 200 detected through a sensor of the remote controller 200 is transmitted to the image display apparatus. The image display apparatus may calculate the coordinate of the pointer 205 from the information on the motion of the remote controller 200. The image display apparatus may display the pointer 205 to correspond to the calculated coordinate.

FIG. 4A(c) illustrates a case where the user moves the remote controller 200 away from the display 180 while pressing a specific button of the remote controller 200. Thus, a selection area within the display 180 corresponding to the pointer 205 may be zoomed in so that it can be displayed to be enlarged. On the other hand, when the user moves the remote controller 200 close to the display 180, the selection area within the display 180 corresponding to the pointer 205 may be zoomed out so that it can be displayed to be reduced. Meanwhile, when the remote controller 200 moves away from the display 180, the selection area may be zoomed out, and when the remote controller 200 approaches the display 180, the selection area may be zoomed in.

Meanwhile, when the specific button of the remote controller 200 is pressed, it is possible to exclude the recognition of vertical and lateral movement. That is, when the remote controller 200 moves away from or approaches the display 180, the up, down, left, and right movements are not recognized, and only the forward and backward movements are recognized. Only the pointer 205 is moved according to the up, down, left, and right movements of the remote controller 200 in a state where the specific button of the remote controller 200 is not pressed.

Meanwhile, the moving speed or the moving direction of the pointer 205 may correspond to the moving speed or the moving direction of the remote controller 200.

Figure 4B:
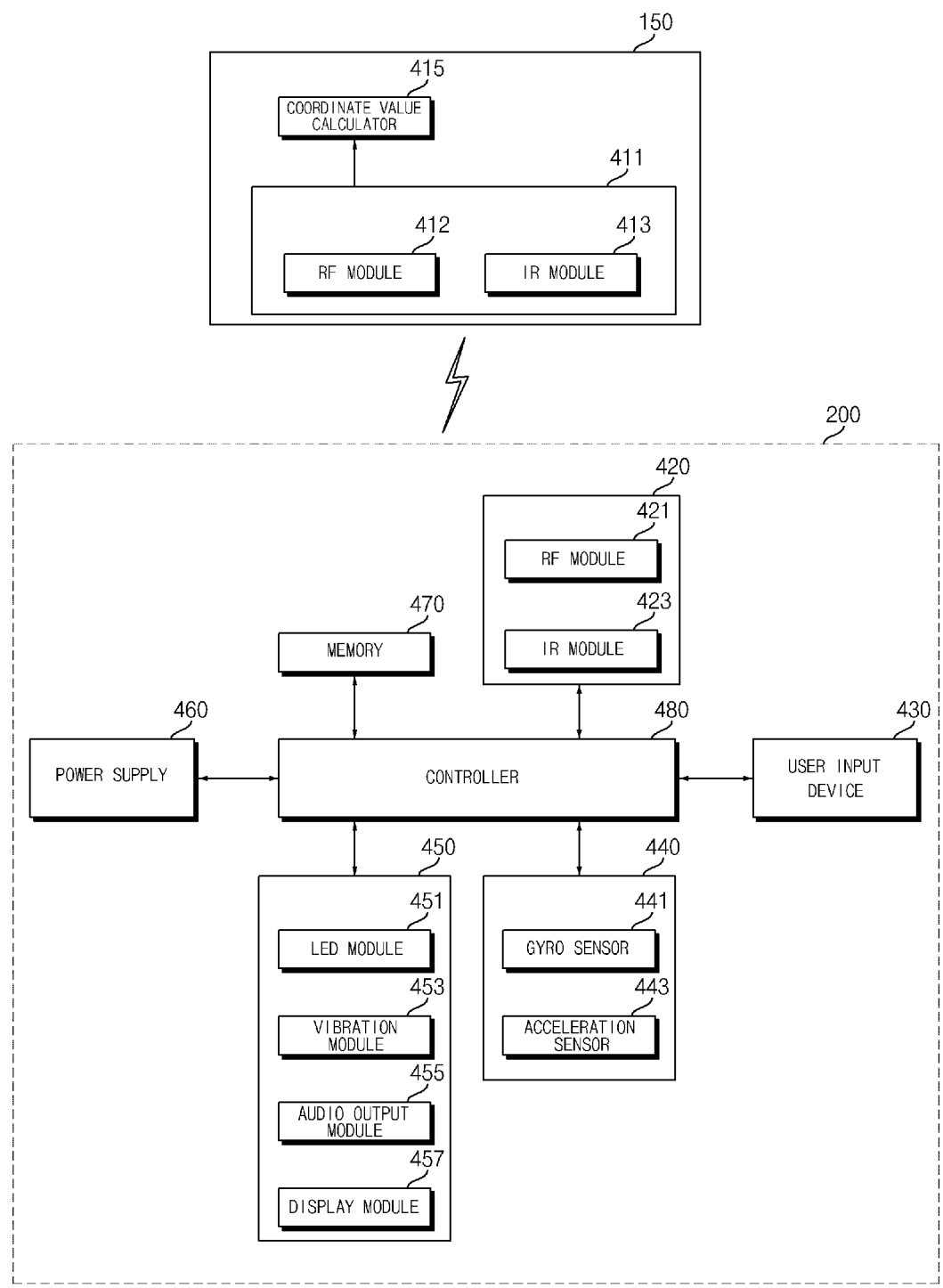
FIG. 4B is an internal block diagram of the remote controller of FIG. 2.

FIG. 4B is an internal block diagram of the remote controller of FIG. 2.

Referring to the drawing, the remote controller 200 includes a wireless communicator 425, a user input device 435, a sensor device 440, an output device 450, a power supply 460, a memory 470, and a controller 480.

The wireless communicator 425 transmits/receives a signal to/from any one of the image display apparatuses according to the embodiments of the present invention described above. Among the image display apparatuses according to the embodiments of the present invention, one image display apparatus 100 will be described as an example.

In the present embodiment, the remote controller 200 may include an RF module 421 for transmitting and receiving signals to and from the image display apparatus 100 according to a RF communication standard. In addition, the remote controller 200 may include an IR module 423 for transmitting and receiving signals to and from the image display apparatus 100 according to a IR communication standard.

In the present embodiment, the remote controller 200 transmits a signal containing information on the motion of the remote controller 200 to the image display apparatus 100 through the RF module 421.

In addition, the remote controller 200 may receive the signal transmitted by the image display apparatus 100 through the RF module 421. In addition, if necessary, the remote controller 200 may transmit a command related to power on/off, channel change, volume change, and the like to the image display apparatus 100 through the IR module 423.

The user input device 435 may be implemented by a keypad, a button, a touch pad, a touch screen, or the like. The user may operate the user input device 435 to input a command related to the image display apparatus 100 to the remote controller 200. When the user input device 435 includes a hard key button, the user can input a command related to the image display apparatus 100 to the remote controller 200 through a push operation of the hard key button. When the user input device 435 includes a touch screen, the user may touch a soft key of the touch screen to input the command related to the image display apparatus 100 to the remote controller 200. In addition, the user input device 435 may include various types of input means such as a scroll key, a jog key, etc., which can be operated by the user, and the present invention does not limit the scope of the present invention.

The sensor device 440 may include a gyro sensor 441 or an acceleration sensor 443. The gyro sensor 441 may sense information about the motion of the remote controller 200.

For example, the gyro sensor 441 may sense information on the operation of the remote controller 200 based on the x, y, and z axes. The acceleration sensor 443 may sense information on the moving speed of the remote controller 200. Meanwhile, a distance measuring sensor may be further provided, and thus, the distance to the display 180 may be sensed.

The output device 450 may output an image or an audio signal corresponding to the operation of the user input device 435 or a signal transmitted from the image display apparatus 100. Through the output device 450, the user may recognize whether the user input device 435 is operated or whether the image display apparatus 100 is controlled.

For example, the output device 450 may include an LED module 451 that is turned on when the user input device 435 is operated or a signal is transmitted/received to/from the image display apparatus 100 through the wireless communicator 425, a vibration module 453 for generating a vibration, an audio output module 455 for outputting an audio, or a display module 457 for outputting an image.

The power supply 460 supplies power to the remote controller 200. When the remote controller 200 is not moved for a certain time, the power supply 460 may stop the supply of power to reduce a power waste. The power supply 460 may resume power supply when a certain key provided in the remote controller 200 is operated.

The memory 470 may store various types of programs, application data, and the like necessary for the control or operation of the remote controller 200. If the remote controller 200 wirelessly transmits and receives a signal to/from the image display apparatus 100 through the RF module 421, the remote controller 200 and the image display apparatus 100 transmit and receive a signal through a certain frequency band. The controller 480 of the remote controller 200 may store information about a frequency band or the like for wirelessly transmitting and receiving a signal to/from the image display apparatus 100 paired with the remote controller 200 in the memory 470 and may refer to the stored information.

The controller 480 controls various matters related to the control of the remote controller 200. The controller 480 may transmit a signal corresponding to a certain key operation of the user input device 435 or a signal corresponding to the motion of the remote controller 200 sensed by the sensor device 440 to the image display apparatus 100 through the wireless communicator 425.

The user input interface 150 of the image display apparatus 100 includes a wireless communicator 151 that can wirelessly transmit and receive a signal to and from the remote controller 200 and a coordinate value calculator 415 that can calculate the coordinate value of a pointer corresponding to the operation of the remote controller 200.

The user input interface 150 may wirelessly transmit and receive a signal to and from the remote controller 200 through the RF module 412. In addition, the user input interface 150 may receive a signal transmitted by the remote controller 200 through the IR module 413 according to a IR communication standard.

The coordinate value calculator 415 may correct a hand shake or an error from a signal corresponding to the operation of the remote controller 200 received through the wireless communicator 151 and calculate the coordinate value (x, y) of the pointer 205 to be displayed on the display 180.

The transmission signal of the remote controller 200 inputted to the image display apparatus 100 through the user input interface 150 is transmitted to the controller 180 of the image display apparatus 100. The controller 180 may determine the information on the operation of the remote controller 200 and the key operation from the signal transmitted from the remote controller 200, and, correspondingly, control the image display apparatus 100.

For another example, the remote controller 200 may calculate the pointer coordinate value corresponding to the operation and output it to the user input interface 150 of the image display apparatus 100. In this case, the user input interface 150 of the image display apparatus 100 may transmit information on the received pointer coordinate value to the controller 180 without a separate correction process of hand shake or error.

For another example, unlike the drawing, the coordinate value calculator 415 may be provided in the controller 170, not in the user input interface 150.

FIG. 5 is an internal block diagram of a display of FIG. 2.

Referring to FIG. 5, the organic light emitting diode panel-based display 180 may include an organic light emitting diode panel 210, a first interface 230, a second interface 231, a timing controller 232, a gate driver 234, a data driver 236, a memory 240, a processor 270, a power supply 290, a current detector 1110, and the like.

The display 180 receives an image signal Vd, a first DC power V1, and a second DC power V2, and may display a certain image based on the image signal Vd.

Meanwhile, the first interface 230 in the display 180 may receive the image signal Vd and the first DC power V1 from the controller 170.

Here, the first DC power V1 may be used for the operation of the power supply 290 and the timing controller 232 in the display 180.

Next, the second interface 231 may receive a second DC power V2 from an external power supply 190. Meanwhile, the second DC power V2 may be input to the data driver 236 in the display 180.

The timing controller 232 may output a data driving signal Sda and a gate driving signal Sga, based on the image signal Vd.

For example, when the first interface 230 converts the input image signal Vd and outputs the converted image signal va1, the timing controller 232 may output the data driving signal Sda and the gate driving signal Sga based on the converted image signal va1.

The timing controller 232 may further receive a control signal, a vertical synchronization signal Vsync, and the like, in addition to the image signal Vd from the controller 170.

In addition to the image signal Vd, based on a control signal, a vertical synchronization signal Vsync, and the like, the timing controller 232 generates a gate driving signal Sga for the operation of the gate driver 234, and a data driving signal Sda for the operation of the data driver 236.

Meanwhile, the timing controller 232 may further output a control signal Cs to the gate driver 234.

The gate driver 234 and the data driver 236 supply a scan signal and an image signal to the organic light emitting diode panel 210 through a gate line GL and a data line DL respectively, according to the gate driving signal Sga and the data driving signal Sda from the timing controller 232. Accordingly, the organic light emitting diode panel 210 displays a certain image.

Meanwhile, the organic light emitting diode panel 210 may include an organic light emitting layer. In order to display an image, a plurality of gate lines GL and data lines DL may be disposed in a matrix form in each pixel corresponding to the organic light emitting layer.

Meanwhile, the data driver 236 may output a data signal to the organic light emitting diode panel 210 based on a second DC power V2 from the second interface 231.

The power supply 290 may supply various power supplies to the gate driver 234, the data driver 236, the timing controller 232, and the like.

The current detector 1110 may detect the current flowing in a sub-pixel of the organic light emitting diode panel 210. The detected current may be input to the processor 270 or the like, for a cumulative current calculation.

The processor 270 may perform each type of control of the display 180. For example, the processor 270 may control the gate driver 234, the data driver 236, the timing controller 232, and the like.

Meanwhile, the processor 270 may receive current information flowing in the sub-pixel of the organic light emitting diode panel 210 from the current detector 1110.

In addition, the processor 270 may calculate the accumulated current of each subpixel of the organic light emitting diode panel 210, based on information of current flowing through the subpixel of the organic light emitting diode panel 210. The calculated accumulated current may be stored in the memory 240.

Meanwhile, the processor 270 may determine as burn-in, if the accumulated current of each sub-pixel of the organic light emitting diode panel 210 is equal to or greater than an allowable value.

For example, if the accumulated current of each subpixel of the OLED panel 210 is equal to or higher than 300000 A, the processor 270 may determine that a corresponding subpixel is a burn-in subpixel.

Meanwhile, if the accumulated current of each subpixel of the OLED panel 210 is close to an allowable value, the processor 270 may determine that a corresponding subpixel is a subpixel expected to burn in.

Meanwhile, based on a current detected by the current detector 1110, the processor 270 may determine a subpixel, having the greatest accumulated current, to be a burn-in expected subpixel.

Meanwhile, based on a current detected by the current detector 1110, the processor 270 may calculate a burn-in subpixel or a burn-in expected subpixel of the OLED panel 210, and may control a current, lower than an allocated current, to flow through subpixels adjacent to the calculated burn-in subpixel or burn-in expected subpixel, thereby extending burn-in of sub-pixels adjacent to the burn-in subpixel. As a result, it is possible to extend the entire service life of the image display apparatus 100 having the OLED panel 210.

Meanwhile, the processor 270 may control a current, higher than the allocated current, to flow through the calculated burn-in subpixel, such that a low current may flow through the subpixels adjacent to the calculated burn-in subpixel, thereby preventing a phenomenon of decreasing luminance.

Meanwhile, if no burn-in occurs in the OLED panel 210, the processor 270 may control a current, lower than the allocated current, to flow through subpixels adjacent to the burn-in expected subpixel, which is expected to burn in, thereby extending burn-in of sub-pixels adjacent to the burn-in expected subpixel. As a result, it is possible to extend the entire service life of the image display apparatus 100 having the OLED panel 210.

Meanwhile, the processor 270 may control a data voltage, lower than an allocated data voltage, to be applied to subpixels adjacent to the calculated burn-in subpixel or burn-in expected subpixel.

Meanwhile, if no burn-in occurs in the OLED panel 210, the processor 270 may control a current, lower than the allocated current, to also flow through the burn-in expected subpixel which is expected to burn in, thereby extending burn-in of the burn-in expected subpixel. As a result, it is possible to extend the entire service life of the image display apparatus 100 having the OLED panel 210.

Meanwhile, the processor 270 may control a current having a second level, higher than a first level, to flow through a second subpixel located further than a first subpixel among subpixels adjacent to the calculated burn-in subpixel or burn-in expected subpixel, such that by controlling a higher current to flow through the second subpixel which is expected to have a longer service life, it is possible to prevent a phenomenon of decreasing luminance.

Meanwhile, the processor 270 may calculate a subpixel, having the greatest accumulated current in the OLED panel, based on a current detected by the current detector 1110, and may control a current, lower than the allocated current, to flow through subpixels adjacent to the subpixel having the greatest accumulated current, thereby extending the entire service life of the image display apparatus 100 having the OLED panel 210.

Meanwhile, the processor 270 may control a lower current to flow through subpixels located closer to the subpixel having the greatest accumulated current, thereby extending the entire service life of the image display apparatus 100 having the OLED panel 210.

Figure 6A:
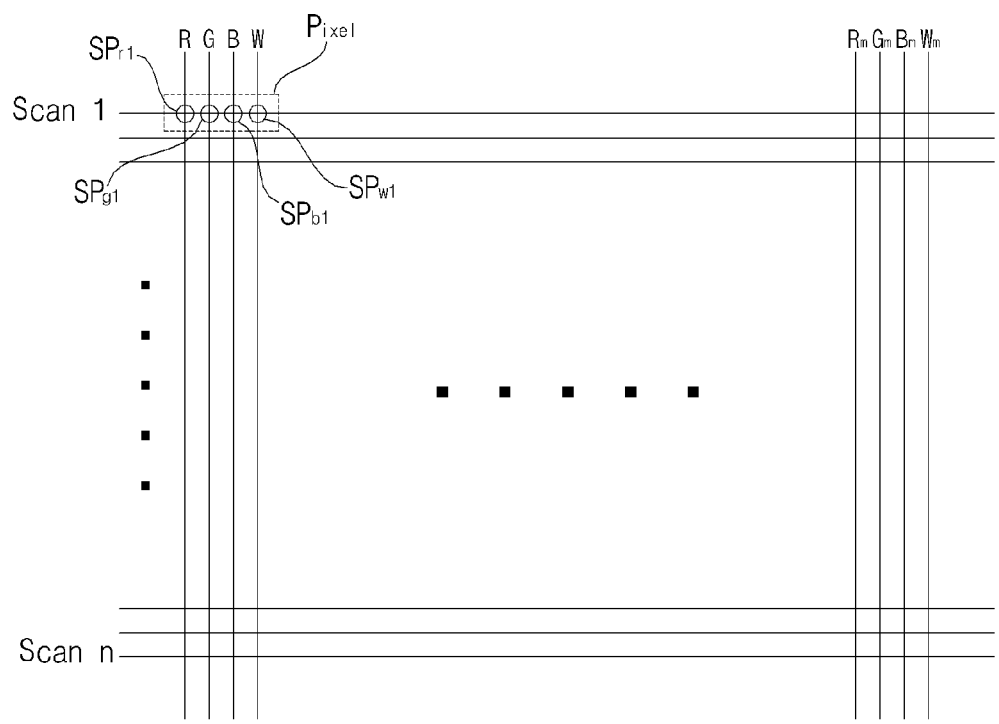
FIG. 6A and FIG. 6B are diagrams referred to in the description of an organic light emitting diode panel of FIG. 5.
Figure 6B:
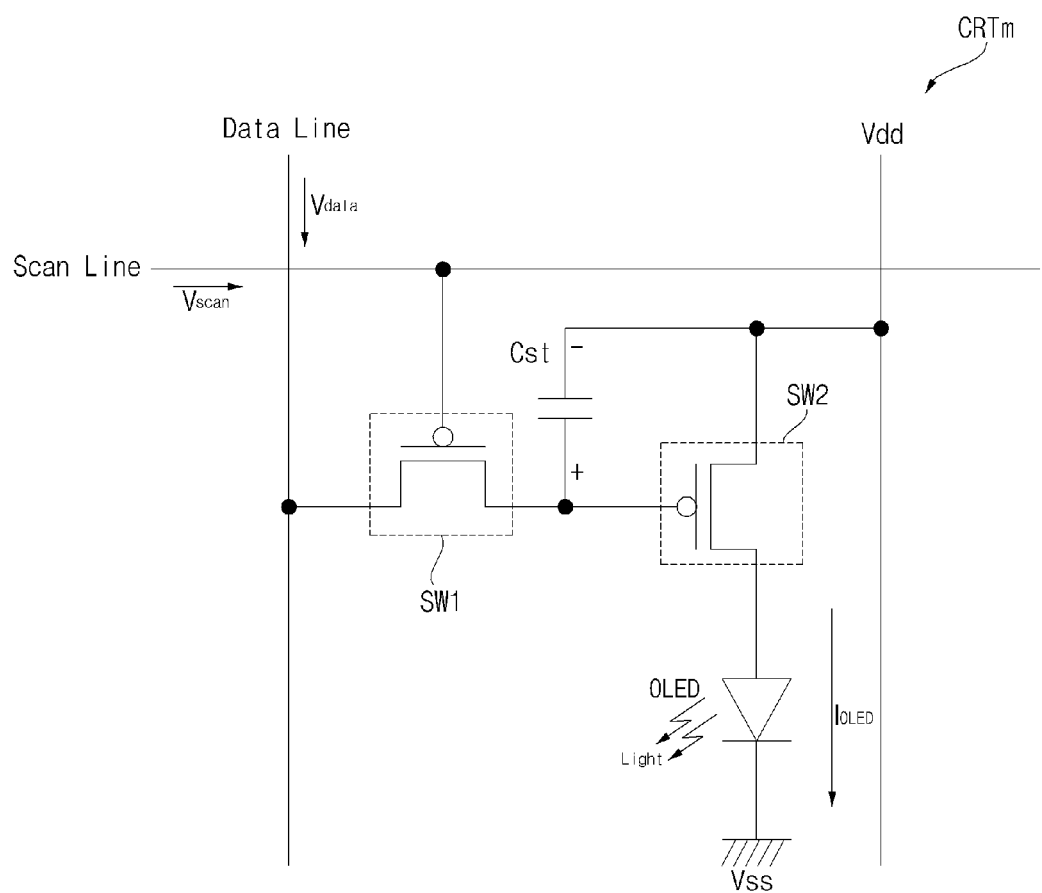

FIGS. 6A and 6B are diagrams referred to in the description of an organic light emitting diode panel of FIG. 5.

Firstly, FIG. 6A is a diagram illustrating a pixel in the organic light emitting diode panel 210.

Referring to drawing, the organic light emitting diode panel 210 may include a plurality of scan lines $Scan^1$ to $Scan_n$, and a plurality of data lines R1, G1, B1, W1 to $R_m$, $G_m$, $B_m$, $W_m$ intersecting the scan lines.

Meanwhile, a pixel (subpixel) is defined in an intersecting area of the scan line and the data line in the organic light emitting diode panel 210. In the drawing, a pixel including sub-pixels SR1, SG1, SB1 and SW1 of RGBW is shown.

FIG. 6B illustrates a circuit of any one sub-pixel in the pixel of the organic light emitting diode panel of FIG. 6A.

Referring to drawing, an organic light emitting sub pixel circuit (CRTm) may include, as an active type, a scan switching element SW1, a storage capacitor Cst, a drive switching element SW2, and an organic light emitting layer (OLED).

The scan switching element SW1 is turned on according to the input scan signal Vdscan, as a scan line is connected to a gate terminal. When it is turned on, the input data signal Vdata is transferred to the gate terminal of a drive switching element SW2 or one end of the storage capacitor Cst.

The storage capacitor Cst is formed between the gate terminal and the source terminal of the drive switching element SW2, and stores a certain difference between a data signal level transmitted to one end of the storage capacitor Cst and a DC power (VDD) level transmitted to the other terminal of the storage capacitor Cst.

For example, when the data signal has a different level according to a Plume Amplitude Modulation (PAM) method, the power level stored in the storage capacitor Cst varies according to the level difference of the data signal Vdata.

For another example, when the data signal has a different pulse width according to a Pulse Width Modulation (PWM) method, the power level stored in the storage capacitor Cst varies according to the pulse width difference of the data signal Vdata.

The drive switching element SW2 is turned on according to the power level stored in the storage capacitor Cst. When the drive switching element SW2 is turned on, the driving current (IOLED), which is proportional to the stored power level, flows in the organic light emitting layer (OLED). Accordingly, the organic light emitting layer OLED performs a light emitting operation.

The organic light emitting layer OLED may include a light emitting layer (EML) of RGBW corresponding to a subpixel, and may include at least one of a hole injecting layer (HIL), a hole transporting layer (HTL), an electron transporting layer (ETL), and an electron injecting layer (EIL). In addition, it may include a hole blocking layer, and the like.

Meanwhile, all the subpixels emit a white light in the organic light emitting layer OLED. However, in the case of green, red, and blue subpixels, a subpixel is provided with a separate color filter for color implementation. That is, in the case of green, red, and blue subpixels, each of the subpixels further includes green, red, and blue color filters. Meanwhile, since a white subpixel outputs a white light, a separate color filter is not required.

Meanwhile, in the drawing, it is illustrated that a p-type MOSFET is used for a scan switching element SW1 and a drive switching element SW2, but an n-type MOSFET or other switching element such as a JFET, IGBT, SIC, or the like are also available.

Meanwhile, the pixel is a hold-type element that continuously emits light in the organic light emitting layer (OLED), after a scan signal is applied, during a unit display period, specifically, during a unit frame.

Meanwhile, subpixels emit light as a current flows to the organic light emitting layer OLED in the respective subpixels illustrated in FIG. 6B.

Figure 7:
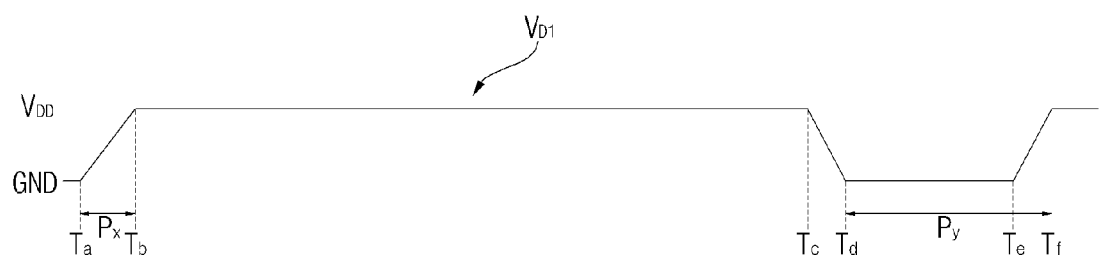
FIG. 7 is a diagram illustrating a voltage supplied to a display when AC power is supplied to a power supply.

FIG. 7 is a diagram illustrating a voltage supplied to a display when AC power is supplied to a power supply.

Referring to the drawing, when AC power is supplied to the power supply 190 at the time point of Ta, the operation power VDD is supplied to the panel 210 of the display 180 to be turned on, at a time point Tb, after a Px period.

Meanwhile, when the AC power supply is stopped at the time point Tc, the voltage applied to the panel 210 is lowered to the ground voltage GND at the time point Td.

Thereafter, when AC power is supplied again to the power supply 190 at the time point of Te, the voltage supplied to the panel 210 of the display 180 rises, and the operation power VDD is supplied to the panel 210 of the display 180 to be turned on at the time point of Tf.

At this time, it is preferable that the period from the time point Td to the time point Tf, or the period from the time point Tc to the time point Tf is equal to or longer than the minimum turn-on standby period so as to protect a panel.

Figure 8:
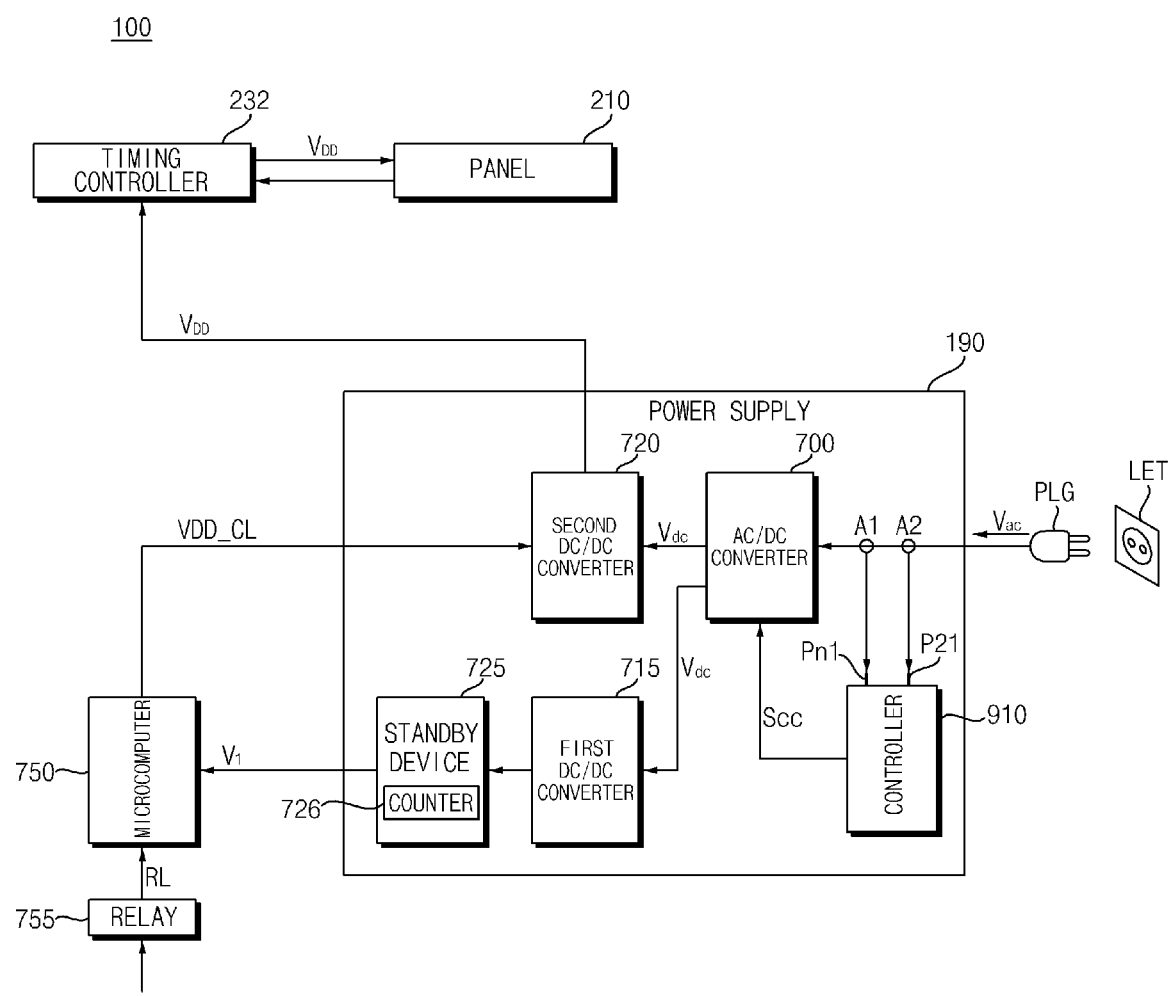
FIG. 8 is an example of an internal block diagram of an image display apparatus according to an embodiment of the present disclosure.

FIG. 8 is an example of an internal block diagram of an image display apparatus according to an embodiment of the present disclosure.

Referring to FIG. 8, the image display apparatus 100 of FIG. 8 includes a power supply 190, a microcomputer 750, a relay 755, a timing controller 232, a panel 210, a first voltage detector A1, and a second voltage detector A2.

When a plug PLG is connected to an outlet LET, AC power Vac is supplied to the power supply 190, and when the plug PLG is detached from the outlet LET, the AC power Vac is not supplied to the power supply 190.

The power supply 190 may include an AC/DC converter 710 for converting the AC power Vac into DC power, a first DC/DC converter 715 for converting a level of the DC power, a second DC/DC converter 720, a standby device 725 for supplying standby power when the power is off, a controller 910, and the like.

The controller 910 may control the AC/DC converter 710, the first DC/DC converter 715, the second DC/DC converter 720, the standby device 725, and the like.

Meanwhile, when a power-on signal from the remote controller 200 is received, the relay 755 operates and an operation signal RL may be input to the microcomputer 750.

The microcomputer 750 receives an operation power V1 from the power supply 190 and operates to output a power control signal VDD CL to the power supply 190.

The power supply 190 may output the operation power VDD to the timing controller 232 in response to the power control signal VDD CL, and the timing controller 232 may output the operation power VDD to the panel 210.

The first voltage detector A1 may detect an input AC voltage by using a first resistor Rm1. Particularly, the first voltage detector A1 may be used to detect an input AC voltage in the form of a sine wave.

Meanwhile, the second voltage detector A2 may detect an input AC voltage by using a differential circuit including a capacitor C1 and a second resistor R2. Particularly, the second voltage detector A2 may be used to detect an input AC voltage in the form of a square wave.

Meanwhile, the controller 910 may include a first terminal Pn1 for receiving a first signal Vac1 detected by the first voltage detector A1, and a second terminal Pn2 for receiving a second signal Vac2 detected by the second voltage detector A2.

Meanwhile, if the input AC voltage is a sine-wave AC voltage, the controller 910 may turn on the switching elements in the converter 700 based on the first signal Vac1; and if the input AC voltage is a square-wave AC voltage, the controller 910 may turn on the switching elements in the converter 700 based on the second signal Vac2, thereby performing a stable operation even when the square-wave AC voltage is applied.

Meanwhile, upon determining that the input AC voltage is applied, the controller 910 may turn on the switching elements in the converter 700 based on the first signal Vac1 or the second signal Vac2, thereby performing a stable operation even when the square-wave AC voltage is applied.

Meanwhile, if a level of the first signal Vac1 crosses a first reference level Vref1, the controller 910 may turn on the switching elements in the converter 700, thereby performing a stable operation even when the square-wave AC voltage is applied.

Meanwhile, if a level of the second signal Vac2 crosses a second reference level Vref2, the controller 910 may turn on the switching elements in the converter 700, thereby performing a stable operation even when the square-wave AC voltage is applied.

Figure 9:
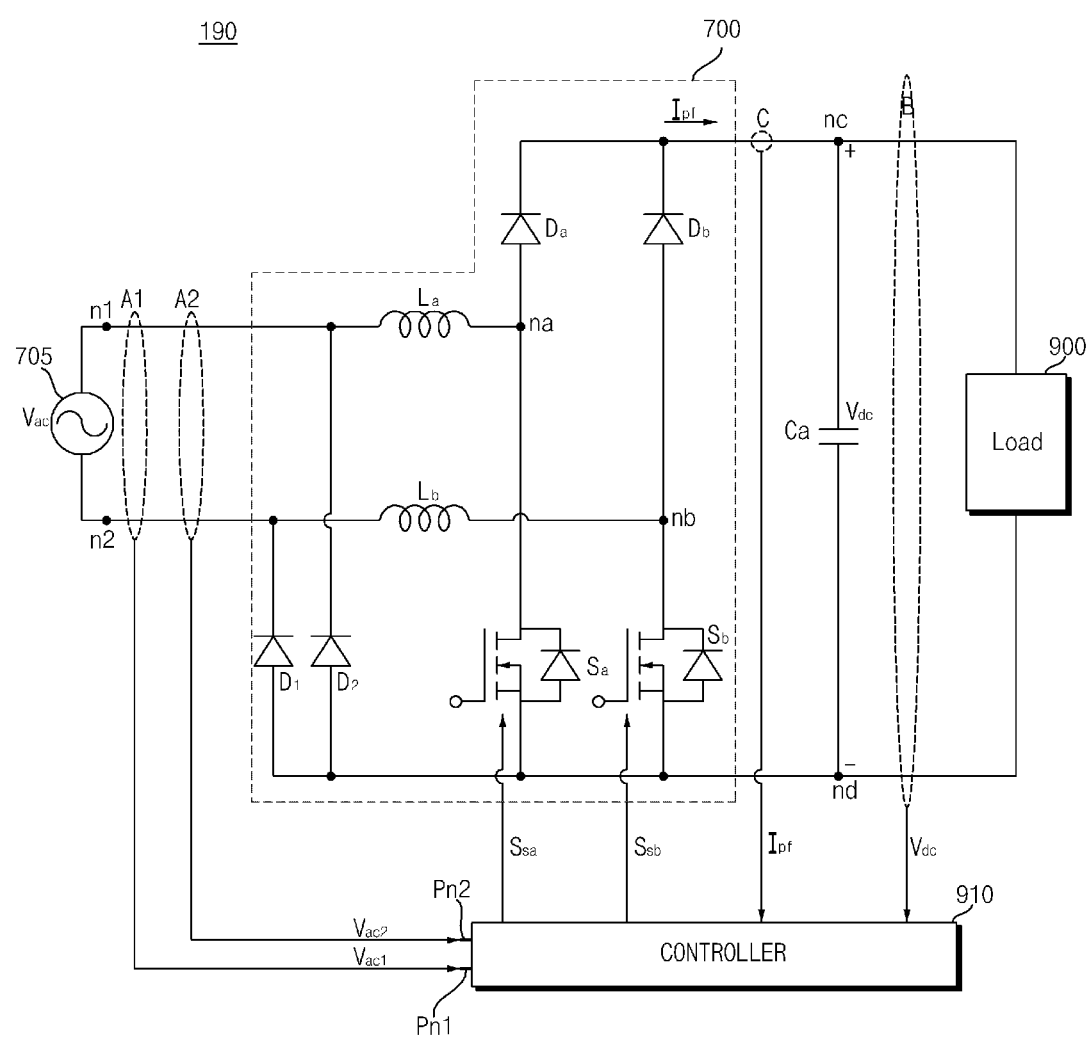
FIG. 9 is an example of an internal circuit diagram of a converter of FIG. 8.

FIG. 9 is an example of an internal circuit diagram of the converter of FIG. 8.

Referring to the drawing, the power supply 190 according to an embodiment of the present disclosure includes a converter 700 for converting input AC power Vac 705 into DC power Vdc and outputting the DC power Vdc, and a controller 910 for controlling the converter 700.

The power supply 190 according to an embodiment of the present disclosure includes: the first voltage detector A1 configured to detect an input AC voltage by using a first resistor Rm1; a second voltage detector A2 configured to detect the input AC voltage by using a differential circuit including a capacitor C1 and a second resistor R2; a capacitor Ca connected to an output terminal nc-nd of the converter

700; a DC terminal voltage detector B configured to detect a voltage at the output terminal nc-nd of the converter 700; and a current detector C configured to detect a current flowing through the converter 700.

The first voltage detector A1 may detect the input voltage Vac input from the input AC power source Vac. To this end, the first voltage detector A1 may include a resistor and the like. The detected first signal Vac1, which is a discrete signal in pulse form, may be input to the controller 910.

The second voltage detector A2 may detect the input voltage Vac input from the input AC power source Vac. To this end, the second voltage detector A2 may include a differential circuit including a capacitor C1 and a second resistor R2, and the like. The detected second signal Vac2, which is a discrete signal in pulse form, may be input to the controller 910.

Meanwhile, the first voltage detector A1 and the second voltage detector A2 may detect input voltages at both ends of nodes n1 and n2.

Meanwhile, the first voltage detector A1 and the second voltage detector A2 may be connected in parallel with each other between the input AC power source 705 and the converter 700.

The current detector C may detect a current Ipf flowing through the converter 700. To this end, a current transformer (CT), a shunt resistor, and the like may be used as the current detector C. The detected current Ipf, which is a discrete signal in pulse form, may be input to the controller 910.

The DC terminal voltage detector B may detect a DC terminal voltage Vdc between both ends nc-nd of the capacitor Ca. To this end, the DC terminal voltage detector B may include a resistor, an amplifier, and the like. The detected dc terminal voltage Vdc, which is a discrete signal in pulse form, may be input to the controller 910.

The converter 700 includes at least one of switching elements Sa and Sb, and may convert a level of the input power Vac based on a switching operation of the switching elements Sa and Sb, so as to output the DC power Vdc.

For example, the converter 700 may include four full-bridge type switching elements.

In another example, the converter 700 may include two half-bridge type switching elements and two diodes. The half-bridge type switching elements are illustrated in the drawing.

Referring to the drawing, the converter 700 may include a first diode Da and a first switching element Sa which are connected in series with each other, and a second diode Db and a second switching element Sb which are connected in series with each other and are connected in parallel with the first diode Da and the first switching element Sa.

Meanwhile, the converter 700 may further include a first inductor La disposed between an input terminal and a first node na between the first diode Da and the first switching element Sa, and a second inductor Lb disposed between an input terminal and a second node nb between the second diode Db and the second switching element Sb. The first inductor La and the second inductor Lb may be connected in parallel with each other.

When detecting the current Ipf flowing through the converter 700, the current detector C may detect a current flowing through the first inductor La or the second inductor Lb.

Meanwhile, the converter 700 may further include a diode D1 disposed between the input AC power source 705 and the first inductor La, and a diode D2 disposed between the input AC power source 705 and the second inductor Lb. The diode D1 and the diode D2 may be connected in parallel with each other.

In order to reduce power consumption in the power supply 190, the power supply 190 may operate in a first mode, in which the switching elements Sa and Sb perform a continuous switching operation, and a second mode in which the switching elements Sa and Sb perform the continuous switching operation and then stop the switching operation, according to a load 900 at the output terminal nc-nd of the converter 700. Accordingly, even when a square wave AC voltage is applied, the power supply 190 may operate stably. Particularly, the second mode requires less switching compared to the first mode, thereby reducing a switching loss, and thus reducing power consumption.

Meanwhile, according to the load 900 at the output terminal nc-nd of the converter 700, the controller 910 may control the power supply 190 to operate in the first mode, in which the switching elements Sa and Sb perform a continuous switching operation, and the second mode in which the switching elements Sa and Sb perform the continuous switching operation and then temporarily stop the switching operation.

Meanwhile, if the load 900 at the output terminal nc-nd of the converter 700 is greater than or equal to a first level, the controller 910 may control the first mode to be performed; and if the load 900 is less than the first level, the controller 910 may control the second mode to be performed. Particularly, if the load 900 is less than the first level, the switching operation is performed in the second mode, thereby reducing a switching loss, and thus reducing power consumption.

The controller 910 may include the first terminal Pn1 for receiving the first signal Vac1 detected by the first voltage detector A1, and the second terminal Pn2 for receiving the second signal Vac2 detected by the second voltage detector A2.

Meanwhile, based on the first signal Vac1 or the second signal Vac2, the controller 910 may turn on the switching elements in the converter 800. Accordingly, even when a square wave AC voltage is applied, the power supply 190 may operate stably. Particularly, the power supply 190 may operate stably even when various AC voltages are applied.

Meanwhile, if the input AC voltage is in the form of a sine wave, the controller 910 may turn on the switching elements in the converter 700 based on the first signal Vac1; and if the input AC voltage is in the form of a square wave, the controller 910 may turn on the switching elements in the converter 700 based on the second signal Vac2. Accordingly, even when a square wave AC voltage is applied, the power supply 190 may operate stably.

Meanwhile, upon determining that the input AC voltage is applied, the controller 910 may turn on the switching elements in the converter 700 based on the first signal Vac1 or the second signal Vac2. Accordingly, even when a square wave AC voltage is applied, the power supply 190 may operate stably.

Meanwhile, if a level of the first signal Vac1 crosses a first reference level Vref1, the controller 910 may turn on the switching elements in the converter 700, such that the power supply 190 may operate stably even when a square-wave AC voltage is applied.

Meanwhile, if a level of the second signal Vac2 crosses a second reference level Vref2, the controller 910 may turn on the switching elements in the converter 700, such that the power supply 190 may operate stably even when a square-wave AC voltage is applied.

FIGS. 10A to 13B are diagrams referred to in the description of the image display apparatus of FIG. 8.

Figure 10A:
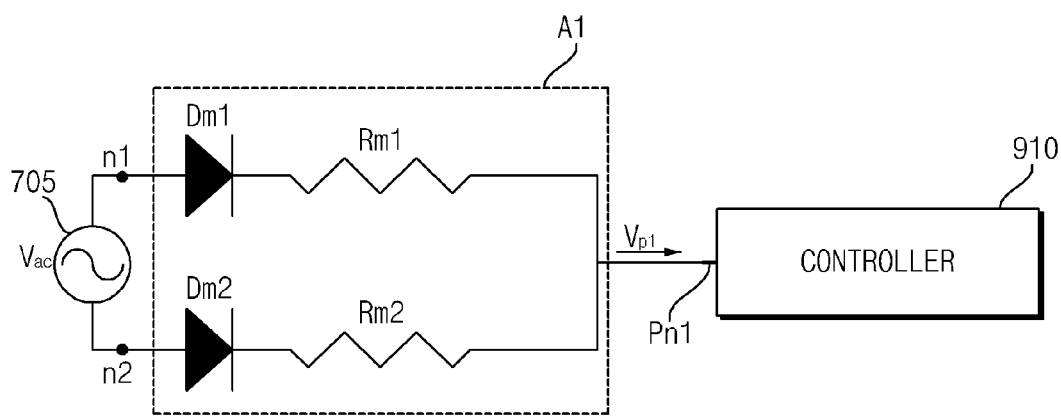
FIGS. 10A to 13B are diagrams referred to in the description of the image display apparatus of FIG. 8.

First, FIG. 10A illustrates an example of a circuit diagram of the first voltage detector A1.

Referring to the drawing, the first voltage detector A1 may include resistors Rm1 and Rm2 for detecting the input AC voltage Vac.

In the drawing, an example is illustrated in which the first voltage detector A1 includes a diode Dm1 and a resistor Rm1 for preventing backflow.

Meanwhile, the first voltage detector A1 may further include a diode dm2 and a resistor Rm2, which may be connected in parallel with the diode Dm1 and the resistor Rm1.

Meanwhile, the diodes Dm1 and Dm2 may be connected in half bridge form.

Meanwhile, the first signal Vac1 detected by the first voltage detector A1 may be input to the first terminal pn1 of the controller 910.

Figure 10B:
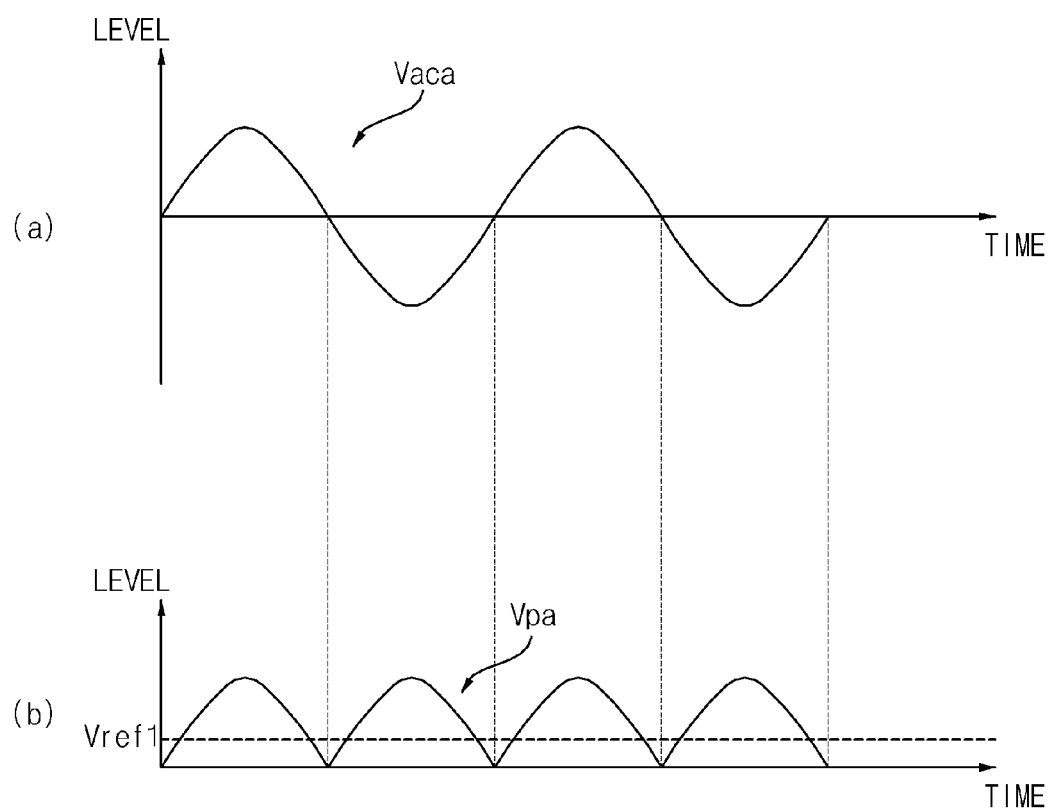

If an input voltage Vaca, which is in the form of a sine wave as illustrated in (a) of FIG. 10B, is input to the first voltage detector A1 of FIG. 10A, the diodes Dm1 and Dm2 may block a negative level of the input voltage Vaca and may pass only the positive level thereof.

Accordingly, the first voltage detector A1 may output a first signal Vpa which is full-wave rectified as illustrated in (b) of FIG. 10B.

That is, if the input AC voltage is in the form of a sine wave, the first voltage detector A1 may output the first signal Vac1 having a level that crosses the first reference level Vref1.

Meanwhile, the controller 910 may determine whether the level of the first signal Vpa crosses the first reference level Vref1; and if the level of the first signal Vpa crosses the first reference level Vref1, the controller 910 may determine that the AC input voltage Vaca is input and may turn on the switching elements in the converter 700.

Figure 10C:
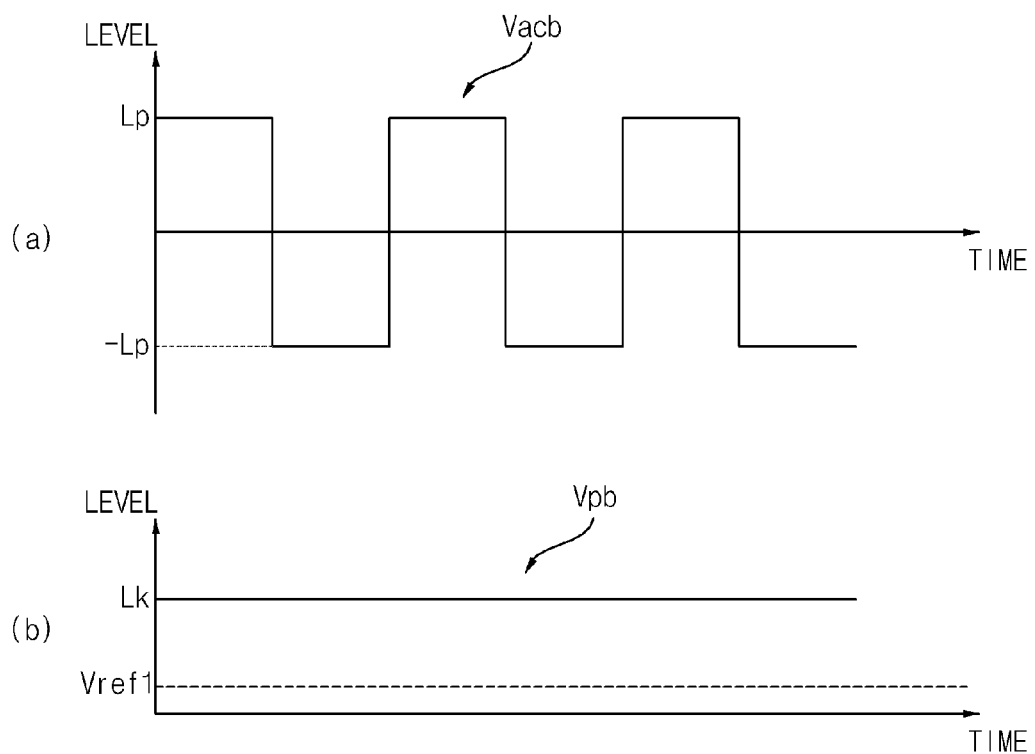
Figure 10D:
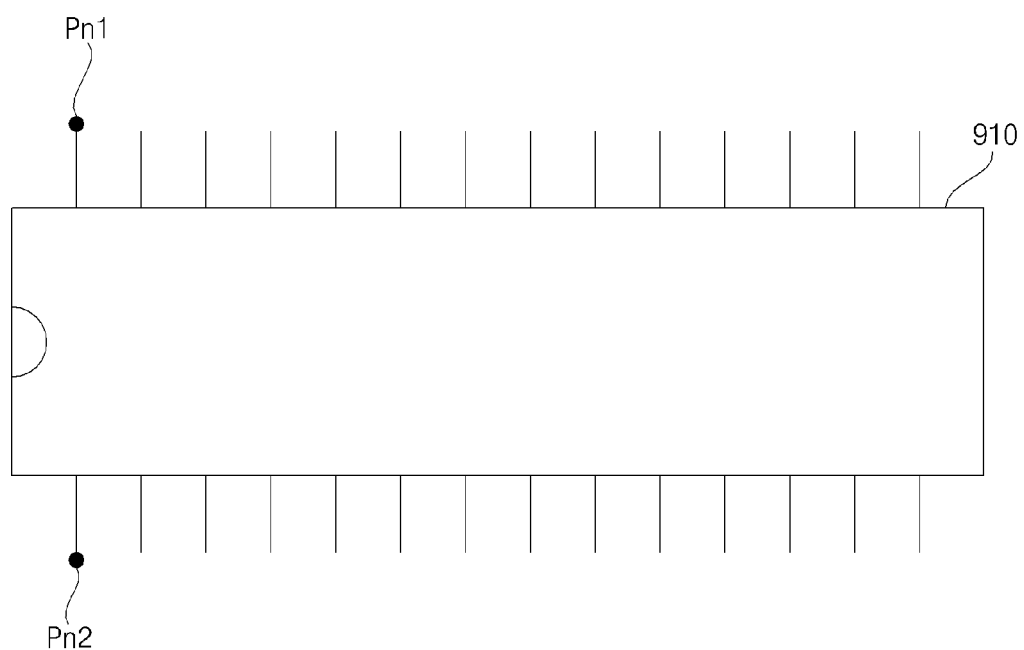

Then, if an input voltage Vacb, which is in the form of a square wave as illustrated in (a) of FIG. 10C, is input to the first voltage detector A1 of FIG. 10A, the diodes Dm1 and Dm2 may block a negative level of the input voltage Vaca and may pass only the positive level thereof.

Accordingly, the first voltage detector A1 may output a second signal Vpb which is full-wave rectified as illustrated in (b) of FIG. 10C.

That is, if the input AC voltage is in the form of a square wave, the first voltage detector A1 may output a second signal Vpb having a level that is higher than the first reference level Vref1.

Meanwhile, the controller 910 may determine whether the level of the second signal Vpb crosses the first reference level Vref1; and if the level of the second signal Vpb does not cross the first reference level Vref1, the controller 910 may determine that the AC input voltage Vacb is not input and may turn off the switching elements in the converter 700.

If the square wave input voltage Vacb is input as illustrated in FIG. 10C, the square wave input voltage may not be detected by using only the first voltage detector A1.

Accordingly, the present disclosure provides the second voltage detector A2, which is connected in parallel with the first voltage detector A1, in order to respond to input voltages of various forms, particularly to detect a square wave input voltage. An example of a circuit of the second voltage detector A2 will be described below with reference to FIG. 11 and the following figures.

Meanwhile, in order to separately receive each of the first signal Vac1 detected by the first voltage detector A1 and the second signal Vac2 detected by the second voltage detector A2, the controller 910 according to an embodiment of the present disclosure may further include the first terminal Pn1 for receiving the first signal Vac1 detected by the first voltage detector A1, and the second terminal Pn2 for receiving the second signal Vac2 detected by the second voltage detector A2. Accordingly, based on the first signal Vac1 and the second signal Vac2 which are input separately, the controller 910 may detect and determine waveforms of various input voltages.

Figure 11:
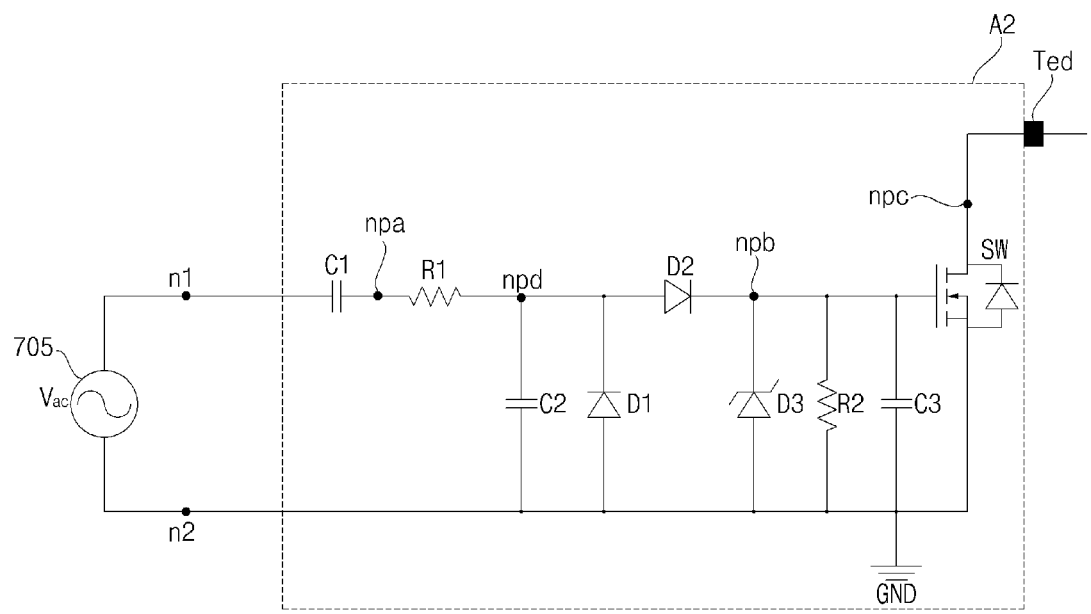

FIG. 11 illustrates an example of a circuit diagram of the second voltage detector A2.

Referring to the drawing, the second voltage detector A2 according to an embodiment of the present disclosure includes: a capacitor C1 connected between the first node n1 and the second node npd; a diode D1 connected between the second node npd and a ground terminal GND; a second diode D2 connected between the second node npd and the third node npb; a second resistor R2 connected between the third node npb and the ground terminal GND; and a second switching element SW having a gate terminal connected to the third node npb and a source terminal connected to the ground terminal GND.

Meanwhile, the second voltage detector A2 may further include: a resistor R1 connected between the first node n1 and the second node npd and connected in series with the capacitor C1; a capacitor C2 connected between the second node npd and the ground terminal GND and connected in parallel with the diode D1; and a capacitor C3 connected between the third node npb and the ground terminal GND and connected in parallel with the second resistor R2.

The capacitor C1 and the second resistor R2 included in the second voltage detector A2 may form a differential circuit, and the input AC voltage is charged into the capacitor C1 by using a rate of change dv/dt of the input AC voltage.

Particularly, in the case where the input AC voltage is in the form of a square wave, the input AC voltage is charged into the capacitor C1 by using the dv/dt.

Further, the diode D2 blocks a negative voltage level, and transmits only a positive voltage level.

Meanwhile, the second voltage detector A2 may further include a Zener diode D3 between the third node npb and the ground terminal GND. Accordingly, a voltage clamped by the Zener diode D3 may be applied to the gate terminal of the second switching element SW.

Meanwhile, a drain terminal of the second switching element SW is connected to a node npc, and a second signal may be output via a connection terminal Ted.

Meanwhile, the connection terminal Ted of the second voltage detector A2 may be electrically connected to the second terminal Pn2 of the external controller 910.

The operation of the second voltage detector A2 of FIG. 11 will be described in further detail below with reference to FIGS. 12 to 13B.

Figure 12:
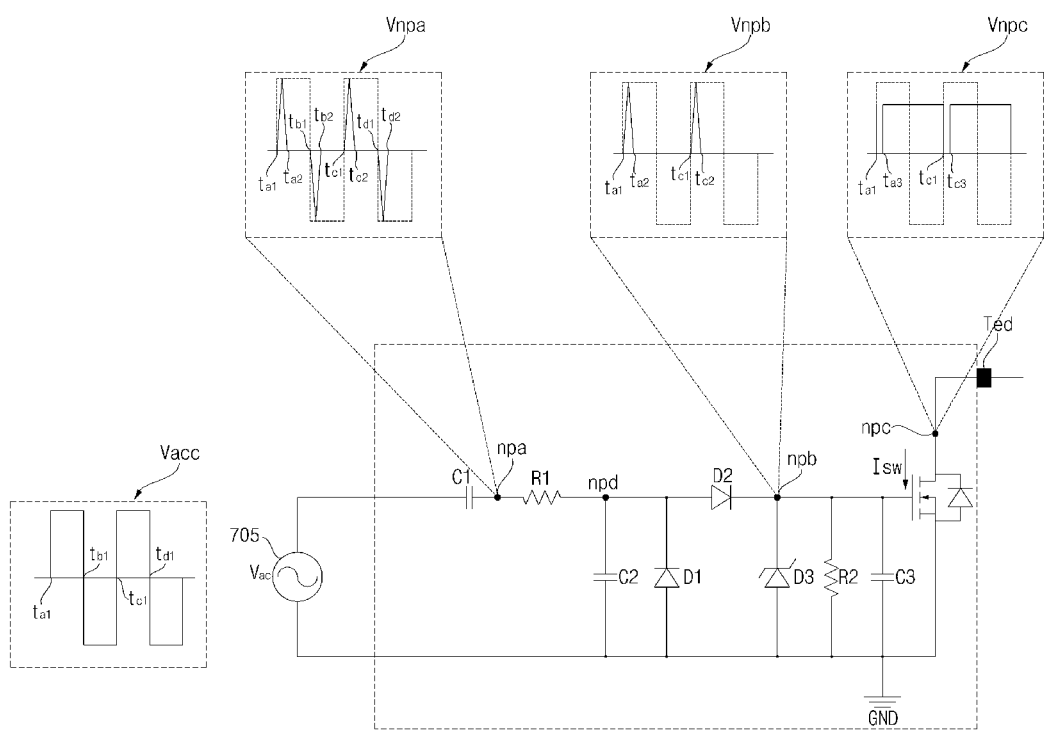

First, referring to FIG. 12, if an input AC voltage is a square wave voltage Vacc having both the positive level and negative level, the input AC voltage is charged into the capacitor C1 by using the dv/dt.

A waveform Vnpa of the voltage charged into the capacitor C1 has a positive voltage level during a period from a time point ta1 to a time point ta2, at which the positive voltage level of the input AC voltage is applied, and has a negative voltage level during a period from a time point tb1 to a time point tb2 at which the negative voltage level of the input AC voltage is applied.

Subsequently, the waveform Vnpa of the voltage charged into the capacitor C1 has a positive voltage level during a period from a time point tc1 to a time point tc2, and has a negative voltage level during a period from a time point td1 to a time point td2 at which the negative voltage level of the input AC voltage is applied.

Next, in the waveform Vnpa of the voltage charged into the capacitor C1, the diode D2 may block the negative voltage level and may bypass only the positive voltage level.

Accordingly, a waveform Vnpb of the voltage passing through the diode D2 has a positive voltage level during a period from the time point ta1 to the time point ta2, at which the positive voltage level of the input AC voltage is applied, and thereafter has a positive voltage level during a period from the time point tc1 to the time point tc2.

Then, the voltage, clamped by the Zener diode D3 connected between the third node npb and the ground terminal GND, may be applied to the gate terminal of the second switching element SW.

Further, the second switching element SW may perform a switching operation according to the clamped voltage.

As a result, if the input AC voltage is in the form of the square wave Vacc having the positive level and the negative level, the second switching element SW is turned on from the time point ta1 to the time point ta3, is turned off from the time point ta3 to the time point tc1, and then is turned on again from the time point tc1 to the time point tc3.

Meanwhile, the time point ta3 may be equal to the time point ta2 of FIG. 12. That is, a period in which the second switching element SW is turned on may correspond to a period of the positive voltage level in the waveform Vnpa of the voltage charged into the capacitor C1 or a period of the positive voltage level in the waveform Vnpb of the voltage passing through the diode D2.

Meanwhile, when the second switching element SW is turned on, a voltage at the ground terminal GND connected to the source terminal is transmitted to the node npc. Accordingly, when the second switching element SW is turned on, the voltage at the node npcdm1 is maintained at a low level.

Meanwhile, when the second switching element SW is turned off, the level of the node npc is maintained at a high level. Particularly, when the second switching element SW is turned off, the level of the node npc is maintained at a high level which is a default level.

Accordingly, the waveform Vnpc of the voltage of the node npc may have a low level when the second switching element SW is turned on as illustrated in FIG. 12, and may have a high level when the second switching element SW is turned off.

Figure 13A:
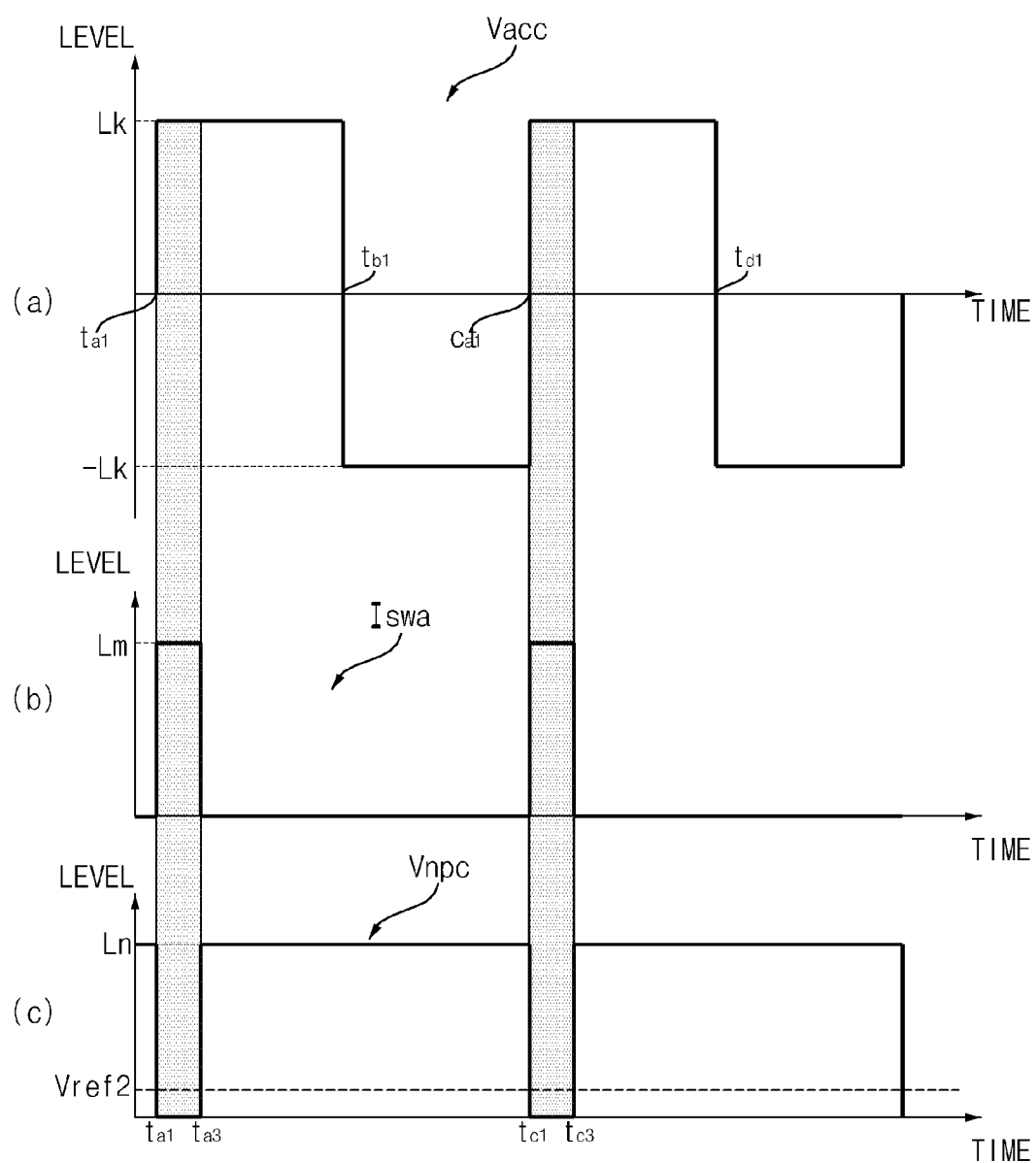

That is, when the input AC voltage is in the form of a square wave Vacc as illustrated in (a) of FIG. 13A, the second voltage detector A2 may output a low level when the second switching element SW is turned on, and may output a high level when the second switching element SW is turned off.

Specifically, in the case where the input AC voltage is in the form of the square wave Vacc as illustrated in (a) of FIG. 13A, a waveform Iswa of a current flowing through the second switching element SW is maintained at a high level Lm from the time point ta1 to the time point ta3, is maintained at a low level Lm from the time point ta3 to the time point tc1, and then is maintained at a high level Lm from the time point tc1 to the time point tc3.

Accordingly, in the case where the input AC voltage is in the form of the square wave Vacc having the positive level and the negative level, the waveform Vnpc of the voltage of the node npc has a high level which is partially delayed with respect to the positive level, and may be maintained at a high level in response to the negative level, as illustrated in FIG. 12 or (c) of FIG. 13A. Accordingly, even when the square wave AC voltage is applied, the power supply 190 may operate stably.

Meanwhile, the high level partially delayed with respect to the positive level may refer to a state in which the voltage waveform has a high level starting from the time point ta3, rather than the time point ta1.

Meanwhile, the low level output from the second voltage detector A2 is desirably lower than the second reference level Vref2, and the high level output from the second voltage detector A2 is desirably greater than the second reference level Vref2. Accordingly, even when the square wave AC voltage is applied, the power supply 190 may operate stably.

Meanwhile, if the level of the second signal Vac2 crosses the second reference level Vref2, the controller 910 may turn on the switching elements in the converter 700, such that the power supply 190 may operate stably even when the square wave AC voltage is applied.

Figure 13B:
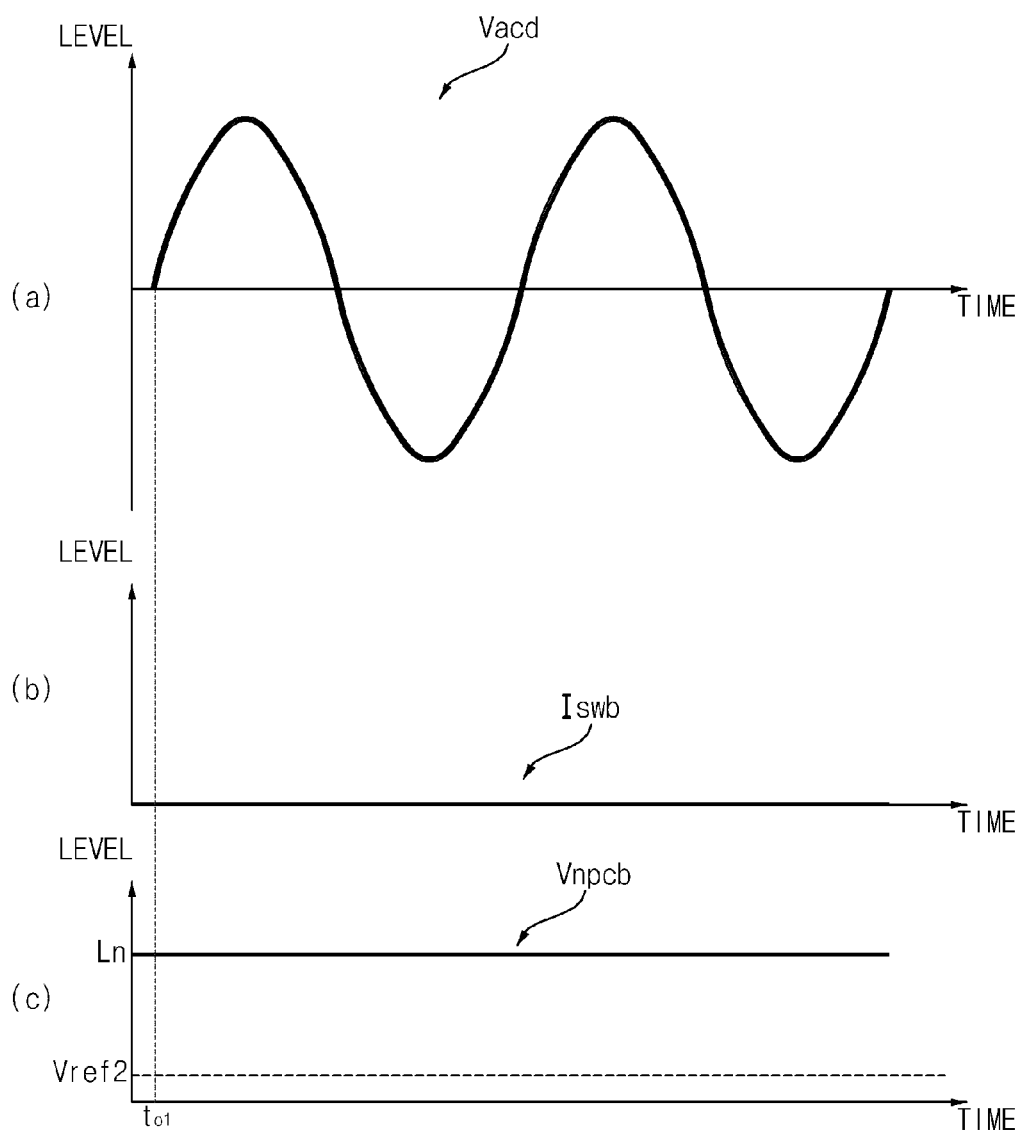

Meanwhile, if the input AC voltage is in the form of a sine wave Vacd as illustrated in (a) of FIG. 13B, the switching elements SW included in the second voltage detector A2 are turned off successively.

Accordingly, as illustrated in (b) of FIG. 13B, a waveform Iswb of the current flowing through the second switching elements SW may be continuously maintained at a low level.

Accordingly, as illustrated in (c) of FIG. 13B, the waveform Vnpc of the voltage of the node npc may be continuously maintained at a high level.

Accordingly, upon receiving the second signal from the second voltage detector A2 as illustrated in (c) of FIG. 13B, the controller 910 may not detect crossing of a level of the signal and the second reference level Vref2.

However, upon receiving the first signal having the sine wave from the first voltage detector A1, the controller 910 may detect crossing of a level of the signal and the first reference level Vref1, thereby controlling the switching elements in the converter 700 to be turned on.

As described above, by using the first voltage detector A1 and the second voltage detector A2, various input voltage waveforms may be detected, thereby controlling the power supply 190 including the converter 700 and the like to operate stably.

Meanwhile, an operating method of the image display apparatus according to the present disclosure can be realized as a processor-readable code written on a recording medium readable by a processor included in the image display apparatus. The processor-readable recording medium may be any type of recording device in which data is stored in a processor-readable manner. Examples of the processor-readable recording medium include a ROM, a RAM, a CD-ROM, a magnetic tape, a floppy disc, an optical data storage, and a carrier wave, e.g., data transmission through the Internet. The processor-readable recording medium can be distributed over a plurality of computer systems connected to a network so that a processor-readable code is written thereto and executed therefrom in a decentralized manner.

It will be apparent that, although the preferred embodiments have been shown and described above, the present disclosure is not limited to the above-described specific embodiments, and various modifications and variations can be made by those skilled in the art without departing from the gist of the appended claims. Thus, it is intended that the modifications and variations should not be understood independently of the technical spirit or prospect of the present disclosure.

What is claimed is:

1. An image display apparatus comprising:
a display; and
a power supply configured to supply power to the display,
wherein the power supply comprises:
a first voltage detector configured to detect an input alternating current (AC) voltage by using a first resistor;
a second voltage detector configured to detect the input AC voltage by using a differential circuit including a capacitor and a second resistor;
a converter including at least one switching element and configured to convert a level of the input voltage based on a switching operation of the switching element to output a direct current (DC) voltage; and
a controller including a first terminal for receiving a first signal detected by the first voltage detector, and a second terminal for receiving a second signal detected by the second voltage detector,
wherein the controller is configured to turn on the switching element in the converter based on the first signal or the second signal.

2. The image display apparatus of claim 1, wherein:
in response to the input AC voltage being a sine wave, the controller is configured to turn on the switching element in the converter based on the first signal; and
in response to the input AC voltage being a square wave, the controller is configured to turn on the switching element in the converter based on the second signal.

3. The image display apparatus of claim 1, wherein upon determining that the input AC voltage is applied, the controller is configured to turn on the switching element in the converter based on the first signal or the second signal.

4. The image display apparatus of claim 1, wherein in response to a level of the first signal crossing a first reference level, the controller is configured to turn on the switching element in the converter.

5. The image display apparatus of claim 1, wherein in response to a level of the second signal crossing a second reference level, the controller is configured to turn on the switching element in the converter.

6. The image display apparatus of claim 1, wherein:
in response to the input AC voltage being the sine wave, the first voltage detector outputs a first signal having a level that crosses the first reference level; and
in response to the input AC voltage being the square wave, the first voltage detector outputs a second signal having a level higher than the first reference level.

7. The image display apparatus of claim 1, wherein the second voltage detector comprises:
the capacitor connected in series between the first node and the second node;
a diode connected between the second node and a ground terminal;
a second diode connected between the second node and a third node;
the second resistor connected between the third node and the ground terminal; and
a second switching element having a gate terminal connected to the third node and a source terminal connected to the ground terminal.

8. The image display apparatus of claim 7, wherein in response to the input AC voltage being the square wave, the second switching element is turned on based on a portion of a positive level of the square wave,
wherein when the second switching element is turned on, the second voltage detector outputs a low level, and when the second switching element is turned off, the second voltage detector outputs a high level.

9. The image display apparatus of claim 8, wherein the low level output by the second voltage detector is lower than a second reference level, and the high level output by the second voltage detector is greater than the second reference level.

10. The image display apparatus of claim 7, wherein in response to the input AC voltage being the square wave, the capacitor is charged based on the square wave,
wherein the second diode bypasses only the positive level of the square wave and blocks the negative level.

11. The image display apparatus of claim 10, wherein the second voltage detector further comprises a Zener diode between the third node and the ground terminal,
wherein a voltage clamped by the Zener diode is applied to the gate terminal of the second switching element.

12. The image display apparatus of claim 7, wherein in response to the input AC voltage being the square wave having the positive level and the negative level, the second voltage detector outputs a second signal having a high level, which is partially delayed with respect to the positive level, and is maintained at the high level in response to the negative level.

13. The image display apparatus of claim 7, wherein in response to the input AC voltage being the sine wave, the second voltage detector outputs a second signal which is maintained at a high level as the second switching element is turned off successively.

14. The image display apparatus of claim 1, wherein the display comprises an organic light emitting diode panel.

15. An image display apparatus comprising:
a display; and
a power supply configured to supply power to the display,
wherein the power supply comprises:
a voltage detector configured to detect an input alternating current (AC) voltage by using a differential circuit including a capacitor and a resistor;
a converter including at least one switching element and configured to convert a level of the input voltage based on a switching operation of the switching element to output a direct current (DC) voltage; and
a controller including a terminal for receiving a signal detected by the voltage detector,
wherein in response to the input AC voltage being a square wave having a positive level and a negative level, the voltage detector outputs a signal having a high level, which is partially delayed with respect to the positive level, and is maintained at the high level in response to the negative level,
wherein the controller is configured to turn on the switching element in the converter based on the signal output by the voltage detector.

16. The image display apparatus of claim 15, wherein in response to a level of the signal output by the voltage detector crossing a reference level, the controller is configured to turn on the switching element.

* * * * *